United States Patent
Shayeb

(10) Patent No.: US 12,417,476 B1
(45) Date of Patent: Sep. 16, 2025

(54) METHODS FOR GROUP PURCHASE OF ACCESS TO INFORMATION

(71) Applicant: Mahmoud Shayeb, Homer Glen, IL (US)

(72) Inventor: Mahmoud Shayeb, Homer Glen, IL (US)

( * ) Notice: Subject to any disclaimer, the term of this patent is extended or adjusted under 35 U.S.C. 154(b) by 0 days.

(21) Appl. No.: 17/105,240

(22) Filed: Nov. 25, 2020

Related U.S. Application Data

(60) Provisional application No. 62/941,147, filed on Nov. 27, 2019.

(51) Int. Cl.
*G06Q 30/00* (2023.01)
*G06Q 30/0601* (2023.01)

(52) U.S. Cl.
CPC ..... *G06Q 30/0605* (2013.01); *G06Q 30/0609* (2013.01); *G06Q 30/0611* (2013.01); *G06Q 30/0627* (2013.01); *G06Q 30/0635* (2013.01)

(58) Field of Classification Search
CPC .......... G06Q 30/0605; G06Q 30/0609; G06Q 30/0611; G06Q 30/0627; G06Q 30/0635
USPC ....................................................... 705/26.2
See application file for complete search history.

(56) References Cited

U.S. PATENT DOCUMENTS

| | | | |
|---|---|---|---|
| 6,883,022 B2 | 4/2005 | Van Wyngarden | |
| 7,480,627 B1 * | 1/2009 | Van Horn | G06Q 10/087 705/14.16 |
| 7,844,489 B2 | 11/2010 | Landesmann | |
| 10,664,861 B1 * | 5/2020 | Kim | G06Q 30/0244 |
| 10,789,629 B2 | 9/2020 | Murray | |
| 10,867,325 B2 * | 12/2020 | Chen | G06Q 30/0605 |
| 11,030,535 B1 * | 6/2021 | Arora | G06Q 30/0282 |
| 11,605,120 B2 * | 3/2023 | Frager | G06Q 30/0635 |
| 2005/0102156 A1 | 5/2005 | Linduff | |
| 2008/0262937 A1 | 10/2008 | Willis | |
| 2011/0313840 A1 * | 12/2011 | Mason | H04W 4/02 705/14.35 |
| 2012/0226614 A1 | 9/2012 | Gura et al. | |

(Continued)

OTHER PUBLICATIONS

Shen-Tsu, W., Meng-Hua, L., & Chun-Chi, L. (2019). Optimal multiple attribute decision model for key parameters of online group buying product. Mathematics, 7(10), 906. doi:https://doi.org/10.3390/math7100906 (Year: 2019).*

*Primary Examiner* — Arielle E Weiner
(74) *Attorney, Agent, or Firm* — Richard Eldredge; Leavitt Eldredge Law Firm

(57) ABSTRACT

Embodiments provide methods and systems for group purchase of product. Method performed by server system includes causing display of a purchase event associated with product. The purchase event depicts product units associated with the product based on sale parameters. The sale parameters include at least a predefined price for the product, total number of product units, an offer price for each product unit and an event expiration time. Method includes receiving a user input from buyer of product for purchasing product units. Method includes facilitating receipt of a part payment for the product units. Method includes determining sale status of product by comparing total number of product units with number of sold product units. The sale status indicates sale complete status if total number of product units is equal to number of sold product units. Method includes sending an access key for product to buyer based on the sale status.

8 Claims, 13 Drawing Sheets

(56) References Cited

U.S. PATENT DOCUMENTS

| | | | |
|---|---|---|---|
| 2013/0006747 A1* | 1/2013 | Wu | G06Q 30/0605 705/14.35 |
| 2013/0018751 A1* | 1/2013 | Winslade | G06Q 30/02 705/26.2 |
| 2015/0073929 A1* | 3/2015 | Psota | G06Q 30/0605 705/26.2 |
| 2015/0235249 A1* | 8/2015 | Wrenn | G06Q 30/0206 705/7.35 |
| 2016/0042418 A1* | 2/2016 | Traina | G06F 16/955 705/26.3 |
| 2016/0071139 A1 | 3/2016 | Esch | |
| 2016/0086222 A1* | 3/2016 | Kurapati | G06Q 40/08 705/14.53 |
| 2016/0171468 A1* | 6/2016 | Pugh | G06Q 20/20 705/16 |
| 2016/0379301 A1* | 12/2016 | Feldman | G06Q 30/08 705/26.2 |
| 2017/0178074 A1* | 6/2017 | Marsh | G06F 21/6218 |
| 2017/0357993 A1* | 12/2017 | Thuesen | G06Q 30/0214 |
| 2019/0180350 A1* | 6/2019 | Marra | G06Q 30/0637 |

* cited by examiner

| PRODUCT ID 552 | PRODUCT NAME 554 | TOTAL PRODUCT UNITS 556 | PRODUCT UNITS SOLD IN LAST 1 HOUR 558 | POPULARITY SCORE 560 | OFFER PRICE / PRODUCT UNIT 562 | ADAPTED OFFER PRICE / PRODUCT UNIT 564 |
|---|---|---|---|---|---|---|
| 220 | PRODUCT 1 | 100 | 10 | 05 | $10 | $10 |
| 221 | PRODUCT 2 | 200 | 50 | 10 | $20 | $25 |
| 222 | PRODUCT 3 | 50 | 05 | 05 | $08 | $8 |
| 223 | PRODUCT 4 | 100 | 20 | 03 | $10 | $12 |

FIG. 5C

METHODS FOR GROUP PURCHASE OF ACCESS TO INFORMATION

TECHNICAL FIELD

The present disclosure relates to information access and, more particularly to, electronic methods and processing systems for group purchase of access to information.

BACKGROUND

Digital technology has risen to prominence and profoundly influenced how people access information. More specifically, social networking has evolved as the greatest global information platform for sharing information. However, the general public does not have access to valuable information such as secrets, undisclosed or classified information, upcoming announcements that is held or owned by prominent people or business organizations in any field. Most of the times, information sourced from third-party sources are not authentic, unreliable, biased and create chaos.

Increasingly, prominent people share snippets of their lives, projects, convictions, beliefs, future decisions via social media. Similarly, business institutions keep the general public updated about their performance, novel technology, future ventures, important breakthroughs, etc., via news and social media handles which reach a large population creating a great impact. This impact of sharing information can be reaped to have economic benefits. However, public figures, celebrities, business leaders, politicians, or the general public do not have a way of exchanging such valuable information for monetary benefit.

Nowadays, many customers prefer to purchase from e-commerce sites (i.e., an online retailers) at the comfort of their home via mobile devices. Moreover, there exist techniques for a group of buyers to join together and purchase a product/service from e-commerce sites at a reduced price within a given time frame based on demand for the product/service. However, each of the buyers gets to own the product/service they offered to buy in the group purchase. Furthermore, there is currently no business method that allows a group of buyers to join together and collectively buy access to information (a product).

In view of the above, there appears a need to devise techniques for group buying access to information and also exchanging hidden pieces/units of information for economic gain.

SUMMARY

Various embodiments of the present disclosure provide group purchase methods and systems for accessing information.

In an embodiment, a computer-implemented method is disclosed. The computer-implemented method performed by a server system includes causing display of a purchase event associated with a product. The purchase event depicts a plurality of product units associated with the product based, at least in part, on a plurality of sale parameters. The plurality of sale parameters includes at least a predefined price for the product, an offer price for each product unit of the plurality of product units and an event expiration time. The computer-implemented method includes receiving a user input from at least one buyer of the product for purchasing one or more product units of the plurality of product units associated with the product. The computer-implemented method includes facilitating receipt of at least a part payment for the one or more product units purchased by the at least one buyer. The computer-implemented method also includes determining at preset intervals a sale status of the product by comparing the total number of product units with a number of sold product units. The sale status indicates a sale complete status if the total number of product units is equal to the number of sold product units. The computer-implemented method further includes sending an access key for the product to the at least one buyer based, at least in part, on the sale complete status of the product.

In another embodiment, a server system is disclosed. The server system includes a communication interface, a memory including executable instructions and a processor communicably coupled to the communication interface. The processor is configured to execute the executable instructions to cause the server system to at least cause display of a purchase event associated with a product. The purchase event depicts a plurality of product units associated with the product based, at least in part, on a plurality of sale parameters. The plurality of sale parameters includes at least a predefined price for the product, an offer price for each product unit of the plurality of product units and an event expiration time. The server system is further caused to receive a user input from at least one buyer of the product for purchasing one or more product units of the plurality of product units associated with the product. The server system is further caused to facilitate receipt of at least a part payment for the one or more product units purchased by the at least one buyer. The server system is further caused to determine a sale status of the product by comparing the total number of product units with a number of sold product units. The sale status indicates a sale complete status if the total number of product units is equal to the number of sold product units. The server system is further caused to send an access key for the product to the at least one buyer based, at least in part, on the sale complete status of the product.

In yet another embodiment, a computer-implemented method is disclosed. The computer-implemented method performed by a server system includes causing display of a purchase event associated with a product. The purchase event depicts a plurality of product units associated with the product based, at least in part, on a plurality of sale parameters. The plurality of sale parameters includes at least a predefined price for the product, an offer price for each product unit of the plurality of product units and an event expiration time. The computer-implemented method includes receiving a user input from at least one buyer of the product for purchasing one or more product units of the plurality of product units associated with the product. The computer-implemented method includes facilitating receipt of at least a part payment for the one or more product units purchased by the at least one buyer. The computer-implemented method also includes determining if an event status associated with the purchase event is terminated based, at least in part, on the event expiration time. The computer-implemented method includes, on successfully determining the event status associated with the product as terminated, comparing the total number of product units with a number of sold product units to determine a sale status of the product. The sale status indicates a sale complete status if the total number of product units is equal to a number of sold product units. The computer-implemented method further includes, on determining the sale complete status, sending an access key for the product to the at least one buyer.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 4A is an example representation of a purchase event depicting a plurality of product units associated with a product, in accordance with an example embodiment of the present disclosure;

FIG. 4B is an example representation of the purchase event depicting an event status when a group of buyers join together to purchase some product units of the plurality of product units, in accordance with an example embodiment of the present disclosure;

FIG. 5C shows an example representation of a table maintained at a server system depicting dynamic adapting of offer price of unsold product units among a plurality of product units, in accordance with an example embodiment of the present disclosure;

Figure 1:
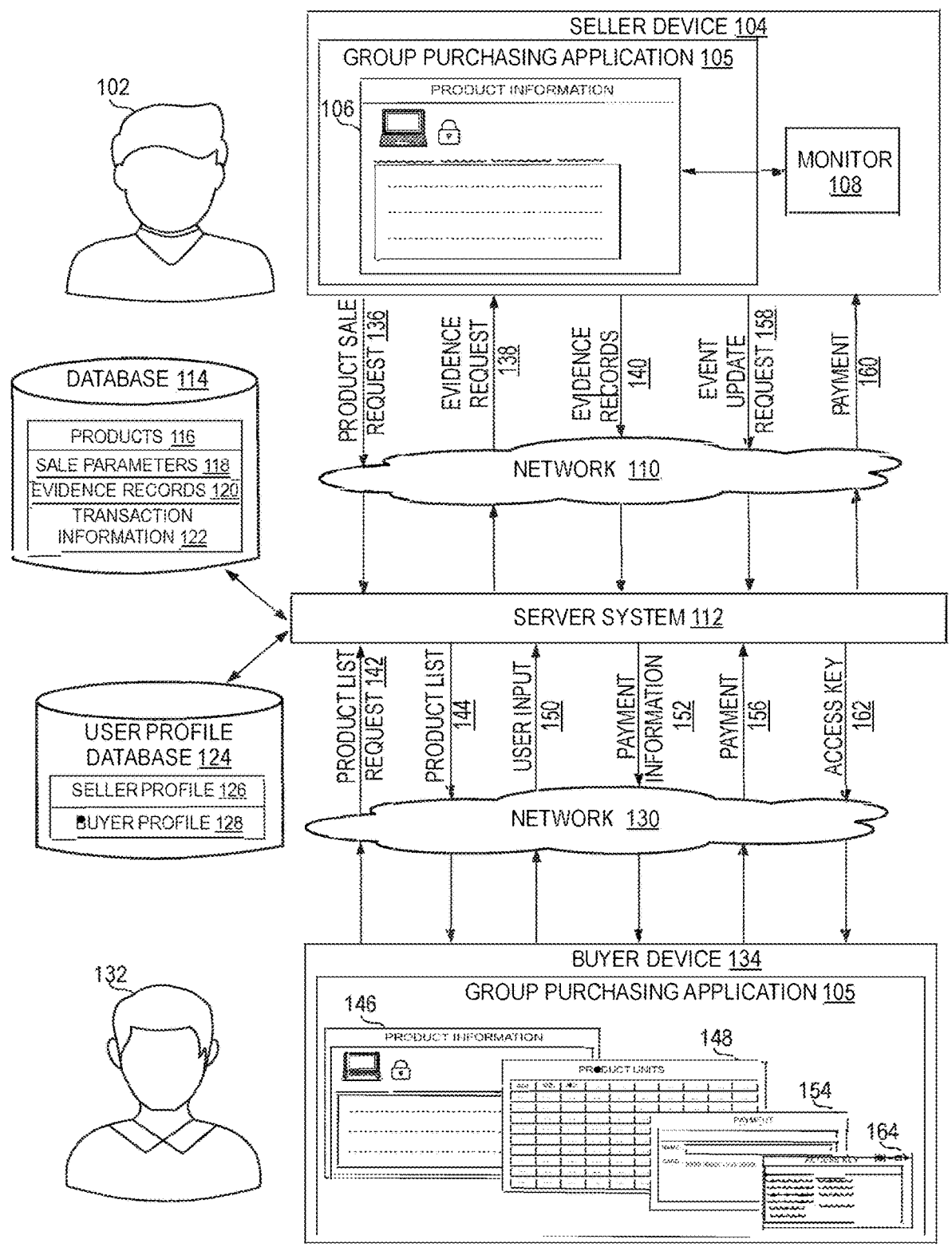
FIG. 1 represents an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "product" used herein, refers to any piece of information that can be sold for economic gain. Typically, products are valuable information such as secrets, undisclosed or classified information, upcoming announcements, business, political decisions, or any other type of information that is kept, held, owned, or known to public figures, celebrities, business leaders, politicians, or any persons or organizations, in the fields of sports, entertainment, politics, business, or any other field. For example, the information may be a personal or professional secret, a food recipe, access code, a design manual of a product, the date when somebody will do something, a prediction by somebody, an upcoming news announcement, a person's promise to do or not to do an action, a blockchain block, a piece of software code, and any other piece of information which can be monetized. The terms "product" or "information" will be used interchangeably herein. Moreover, the terms "product unit" and "share" have been used interchangeably throughout the description.

Overview

Various embodiments of the present disclosure provide methods, systems electronic devices and computer program products for purchasing access to information. More specifically, embodiments of the present disclosure provide a platform (e.g., e-commerce website) to disclose confidential or undisclosed information. Such techniques for accessing information help common public to receive authenticated information from the owner or a reliable source of the information thereby eliminating false/incorrect information from circulation among the general public.

In an example, the present disclosure describes a server system that provides access to authenticated information. The server system includes at least a processor and a memory. The server system is configured to receive a product sale request from a seller. The product sale request includes at least a product description, a product category, a seller information and the plurality of sale parameters. The product refers to information that is confidential or undisclosed by the seller that may be represented in one or more of a text, an image, an audio and a video. The server system is configured to validate the product sale request based at least in part on one or more evidence records provided by the seller. The evidence records may include supporting information for the product in the form of text, image, audio, video or any combination thereof. The validation is performed to facilitate determining content accuracy of the product prior to display of the purchase event. The server system may send the product sale request along with evidence records to an expert committee to validate content accuracy of the information.

After validation, the server system is configured to cause display of a purchase event associated with the product. The purchase event depicts a plurality of product units associated with the product based, at least in part, on a plurality of sale parameters. Specifically, access to the product is depicted as multiple shares/product units that the buyers can purchase for gaining access to the information. In one embodiment, the plurality of product units are equal product units and the offer price for the plurality of product units are same. In another embodiment, the plurality of product units are unequal product units and the offer price is assigned for each of the product units based at least in part on a size of the product unit. For example, product units that are depicted as bigger units are charged more, whereas product units that are depicted as small units are charged less. The plurality of sale parameters includes at least a predefined price for the product, a total number of product units, an offer price for each product unit of the plurality of product units and an event expiration time. The server system is configured to receive a user input from at least one buyer of the product for purchasing one or more product units of the plurality of product units associated with the product. Each buyer interested in purchasing access to the product may purchase preferred number of product units. The server system is configured to facilitate receipt of at least a part payment for the one or more product units purchased by the at least one buyer. The part payment includes a total price for the product units bought by the buyer. Moreover, the server system is also configured to receive one or more buyer preferences for receiving the access key for the product. The one or more buyer preferences correspond to one or more of an electronic mail, a Short Message Service (SMS), a social networking handle, a printed document and a voice message.

In some example embodiments, the server system is configured to receive a sale parameter change request from the seller for facilitating adaptation of one or more sale parameters of the plurality of sale parameters associated with the purchase event prior to the event expiration. Accordingly, the server system is configured to modify the one or more sale parameters of the plurality of sale parameters based, at least in part, on the sale parameter change request. For example, the seller may choose to decrease offer price per product unit to increase sale of the product or change the event expiration time. Thereafter, the server system causes display of the purchase event with the one or more modified sale parameters for the product. More specifically, buyers who view the product/product units after processing of the sale parameter change request can view only the modified sale parameters based on the changes provided by the seller.

In another embodiment, the server system is configured to track at least one of a trending product, a recently introduced product, products in categories preferred by a plurality of buyers, an event expiration product and seller popularity. The tracking is performed to facilitate determination of a product popularity score. Further, the server system is configured to adapt dynamically offer price of unsold product units among the plurality of product units associated with the product based, at least in part, on the popularity score.

In one embodiment, the server system is configured to determine at preset intervals a sale status of the product by comparing the total number of product units with a number of sold product units. The sale status indicates a sale complete status if the total number of product units is equal to the number of sold product units. In general, if all product units associated with the product are sold, then the sale is complete (i.e., sale complete status).

In another embodiment, the server system is configured to determine an event status associated with the purchase event by comparing a current time and the event expiration time. Further, the purchase event is terminated based on the event expiration time. More specifically, when a current time exceeds the event expiration time, the server system updates the event status as event complete status. In other words, the purchase event depicting sale of product units associated with the product is terminated. Further, on successfully determining the event status associated with the product as terminated, the server system is configured to calculate a transaction amount associated with sale of the total number of product units purchased by the at least one buyer. The transaction amount is obtained by aggregating the part payments for the plurality of product units. In other words, the transaction amount is an aggregation of part payments made by the at least one buyer for purchasing the access to the product.

In one embodiment, the server system is configured to place a hold on a processing fee from the transaction amount. The processing fee is deducted by the server system for facilitating sale of the product or access to the product. Then, the server system calculates a payment amount for the seller based at least in part on the processing fee and the transaction amount. Specifically, the processing fee is deducted from the transaction amount to determine the payment amount for the seller. Thereafter, the server system is configured to process the payment amount to the seller.

In one embodiment, the server system is configured to calculate a total number of product units purchased by the at least one buyer. The server system selects a buyer preference from the one or more buyer preference for sending the access key based, at least in part, on the total number of product units purchased by the at least one buyer. For example, buyers who purchased more number of product units receive the access key to the information quickly by a most preferred method than the buyers who bought lesser product units. Thereafter, the server system is configured to send an access key for the product to the at least one buyer based, at least in part, on the sale status of the product. If the sale status indicates sale complete status, then the access key is shared with the buyers even before the purchase event is terminated. Alternatively, if the sale status indicates that the sale status is incomplete, then the part payments made by the buyers are retuned or refunded. In some example embodiments, when the sale status indicates the sale complete status, the access key for the product is sent only after the event expiration time. More specifically, even if all the product units associated with the product are sold earlier than the event expiration time, the server system is configured to send the access key to the buyers only after terminating the purchase event.

Various example embodiments of the present disclosure are described hereinafter with reference to FIGS. 1 to 8.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, group purchasing, accessing information, etc.

The environment 100 generally includes a plurality of sellers (e.g., a seller 102), a server system 112, and a plurality of buyers (e.g., a buyer 132). The seller 102 is coupled to and in communication with (and/or with access to) the server system 112 via a network 110. The buyer 132 is coupled to and in communication with (and/or with access to) the server system 112 via a network 130. The networks 110/130 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 110/130 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

For example, the networks 110/130 may include multiple different networks, such as a private network made accessible by a plurality of electronic devices (e.g., a seller device 104 associated with a seller 102 and a buyer device 134 associated with the buyer 132), separately, and a public network (e.g., the Internet etc.) through which the seller 102, the plurality of buyers and the server system 112 may communicate. In one embodiment, the plurality of buyers share common interests (e.g., science) and participate in group purchase of access to information. It shall be noted that herein "the buyer 132" refers to the plurality of buyers who collectively participate in group purchasing.

The seller 102 uses an application (i.e., "group purchasing application") on his/her seller device 104 to send a product sale request 136 to the server system 112 for selling a product (such as, for example, a simple recipe to neutralize lactose in milk for lactose intolerant people) related to a specific application domain (e.g., health). The group purchasing application is hosted and managed by the server system 112.

As described herein, the product may include, but not limited to, any type of information, such as classified or undisclosed (e.g., secrets), business decisions, business ventures, personal decisions, access codes for software or discounted services, secret recipes, design methodology, mathematical expressions, and so forth. In one embodiment, the product may also be obtained from a person who licenses or assigns rights to the seller 102.

The seller 102 accesses a seller interface 106 of the group purchasing application for uploading product information. For instance, the seller 102 may want to sell a product (e.g., a design method for a wearable sensor that could predict seizures) in a market place. The seller 102 sends the product sale request 136 to the server system 112 with sale parameters and product information of the product that needs to be listed for sale. The server system 112 requests evidence 138 from the seller 102 for verifying authenticity of the product sale request 136. In other words, accuracy of the information is verified by the server system 112 prior to listing the product for sale on the group purchasing application 105.

Accordingly, the seller 102 shares evidence records 140 for the product to the server system 112 using the seller device 104. The evidence records 140 are validated by the server system 112. For example, the seller 102 and the server system 112 may agree on a method (e.g., voting) for verifying content accuracy of the information based on the evidence records 140.

The environment 100 also includes databases 114, 124 communicatively coupled to the server system 112. In one embodiment, the databases 114, 124 may include multifarious data, for example, Personal Identification Information (PII), social media data, Know Your Customer (KYC) data, payment data, market abuse data, Foreign Account Tax Compliance Act (FATCA) data, credit Bureau data, and Human Resource (HR) data.

The product database 114 may include product related information such as, products 116 (e.g., product information, specification, product category), sale parameters 118 (e.g., sale period, total number of product units, cost per product unit, etc.), evidence records 120 and transaction information 122 (e.g., payment information, transaction attributes, such as transaction amount, source of funds such as bank or credit cards, account identification information, payment card number, cardholder information, or the like).

The user profile database 124 stores user profile data associated with each user (i.e., buyers, sellers) of the group purchasing application. The sellers can register themselves as a seller for listing products on the group buying information. Accordingly, a seller profile 126 of the seller 102 includes personal (e.g., name, age, gender, location, registered contact number, alternate contact number, registered e-mail address, social media handles), product related information associated (e.g., historical data of products sold by the seller) and account identification information (e.g., account number, location, acquirer information) with the seller 102. Similarly, a buyer profile 128 of the buyer 132 includes personal (e.g., name, age, gender, location, registered contact number, alternate contact number, registered e-mail address, interests, social media handles) and product purchase history of the buyer 132.

The seller device 104 and the buyer device 134 may be any electronic device such as, but not limited to, a personal computer (PC), a tablet device, a Personal Digital Assistant (PDA), a voice activated assistant, a Virtual Reality (VR) device, a smartphone and a laptop.

The server system 112 includes a processor and a memory. The server system 112 is configured to perform one or more of the operations described herein. In one embodiment, the server system 112 is configured to enable group purchase of information by buyers (e.g., the buyer 132). In general, the seller 102 provides a group of buyers access to information that may be classified or confidential based on sale parameters.

The server system 112 is in communication with, via the network 130, a plurality of buyers. In other embodiments, the server system 112 may actually be incorporated, in whole or in part, into one or more parts of the environment 100. In addition, the server system 112 should be understood to be embodied in at least one computing device in communication with the network 110/130, which may be specifically configured, via executable instructions, to perform as described herein, and/or embodied in at least one non-transitory computer readable media.

In one example, the buyer 132 sends a product list 142 request to the server system 112 from the buyer device 134. The server system 112 sends a product list 144 to the buyer device 124. The product list 144 is displayed as a web page 146 on the buyer device 134 and includes a plurality of products requested for sale by different sellers. The buyer 132 browses products in different categories based on preferences and interests. In one embodiment, a predefined price of the product is decomposed to a plurality of product units. In other words, the predefined price quoted by the seller for the product is divided into 'n' product units (e.g., 100 product units) as decided by the seller and offer price for each product unit is also decided by the seller in the sale parameter. The product units may be equal or unequal product units and the price/product unit may be fixed or adaptive based on sale parameters.

In one embodiment, when the buyer 132 selects a product, a web page 148 depicting the plurality of product units associated with the product is displayed to the buyer 132. The web page 148 also displays product information such as, seller name, product description, sale expiration time, offer price per product unit among others. The buyer 132 can provide a user input 150 for selecting desired number of product units on the web page 148. Subsequently, the payment information 152 for the product units selected on the web page 148 are calculated by the server system 112 and the buyer makes a payment 156 for the selected product units as shown in web page 154.

The server system 112 can dynamically adapt product unit price for buyers. Specifically, the server system 112 may receive the seller profile details associated with the seller 102 as well during the product sale request 136 for dynamically adapting price of the product during the sale. For example, offer price per product unit for products on sale by a prominent seller (e.g., a celebrated political party) may dynamically increase. Moreover, the offer price of unsold product units associated with the product may appreciate/depreciate based on demand (e.g., popularity).

In one embodiment, the seller device 104 includes a monitor option 108 that tracks purchase event details. For instance, the seller 102 will be updated on current status of sale, such as, number of product units sold, price/product unit, sale expiration time, etc. Accordingly, the seller 102 can update one or more sale parameters (e.g., offer price/product unit, change sale expiration time/date) based on the current status of the sale (shown as event update request 158).

The server system 112 determines sale status of the product at preset intervals (e.g., 5 minutes). The sale status is complete on sale of all product units associated with the product. Further, the server system 112 determines event status of the product based on event expiration time and updates the purchase event with an event complete status when current time exceeds the event expiration time. The server system 112 provides an access key to a group of buyers who purchased product units associated with the product based either on the sale status and/or the event status. In one embodiment, the access key, as described herein, can be in the form of a photo, a document, an audio or video recording, a URL, an access code, a date and time in the past or the future, doing an action, not doing an action, a blockchain block, or any other form of information. The access key may be provided to the buyers who participated in group purchase of the product by a preferred means (i.e., buyer preference) of accessing the information. In this example representation, the access key 162 is provided as a notification on a web page 164 of the buyer device 134.

Thereafter, the server system 112 determines a payment for the seller 102 after deducting a processing fee and provides the payment 160 for the seller 102.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
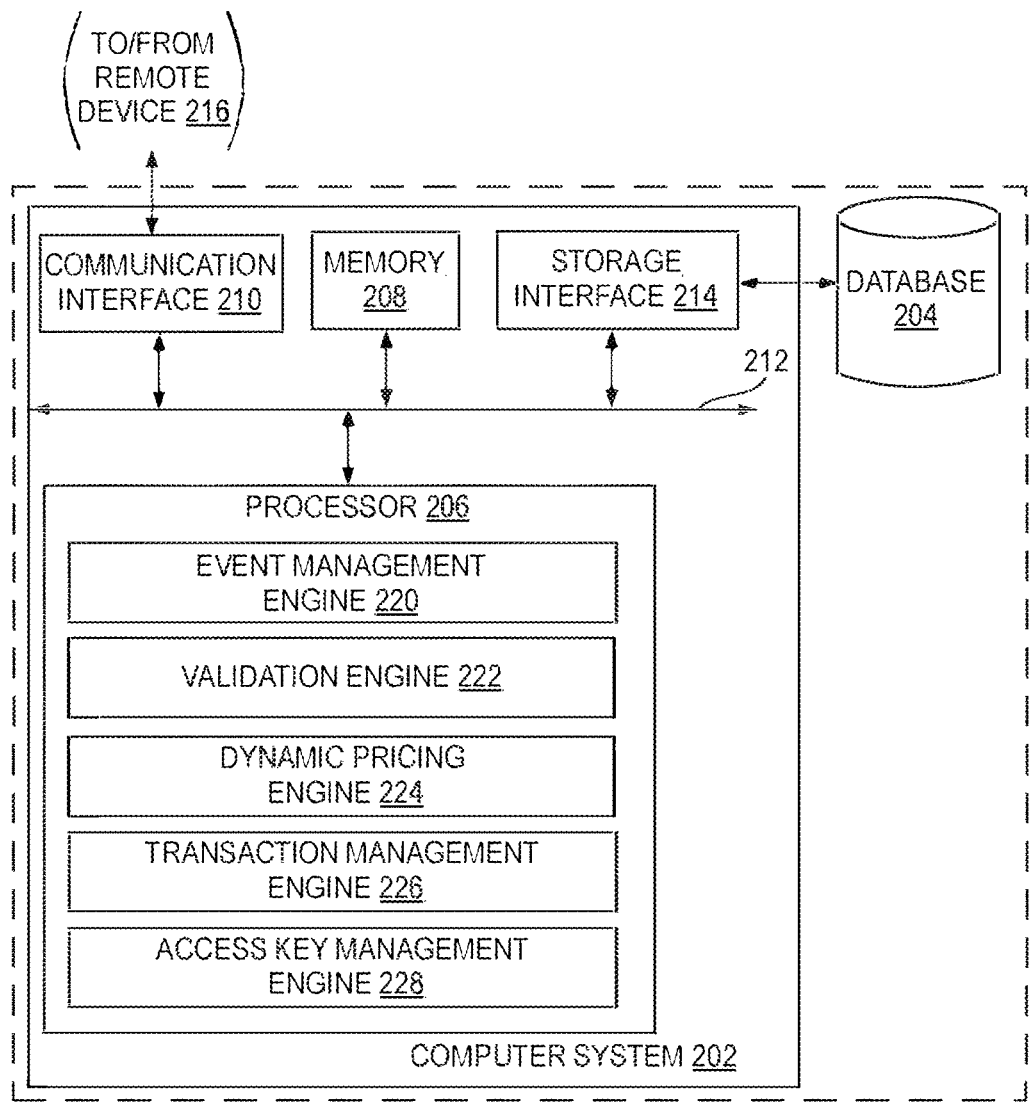
FIG. 2 is a simplified block diagram of a server system, in accordance with an embodiment of the present disclosure.

Referring now to FIG. 2, a simplified block diagram of a server system 200 is shown, in accordance with an embodiment of the present disclosure. The server system 200 is similar to the server system 112. In some embodiments, the server system 200 is embodied as a cloud-based and/or SaaS-based (software as a service) architecture.

The server system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In some example embodiments, the database 204 is configured to store product related information, such as, product description, sale parameters, evidence records, transaction information and user profiles (i.e., buyer profile, seller profile).

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as, the seller device 104 or the buyer device 134, or communicating with any entity connected to the networks 110/130 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes an event management engine 220, a validation engine 222, a dynamic pricing engine 224, a transaction management engine 226 and an access key management engine 228. It should be noted that components, described herein, can be configured in a variety of ways, including electronic circuitries, digital arithmetic and logic blocks, and memory systems in combination with software, firmware, and embedded technologies.

The event management engine 220 includes suitable logic and/or interfaces for managing purchase events associated with a number of products. In an embodiment, the event management engine 220 is configured to receive a product sale request from a seller (e.g., the seller 102) for selling a product. The product sale request includes at least a product description, a product category, seller information and the plurality of sale parameters. The event management engine 220 sends the product sale request to the validation engine 222 for determining authenticity of the request.

After validation, the event management engine 220 creates a purchase event for the product. The purchase event usually depicts a product as a plurality of product units. In general terms, a predefined price of the product is divided into smaller shares (i.e., the product units) and displayed in the purchase event of the product. In other words, the product does not have a specific price but a weighted sum of the offer price of the smaller shares or product units. The number of product units and offer price per product unit are initially determined by the seller. Specifically, the seller 102 specifies the sale parameters for the purchase event. The sale parameters include, but not limited to, a predefined price for the product, a total number of product units, an offer price for each product unit of the plurality of product units associated with the product and an event duration time (i.e., event expiration time).

In one embodiment, the plurality of product units is equal product units. More specifically, the offer prices for the plurality of product units are the same. For example, if a product is sold as 100 equal product units, the pricing of all 100 product units are the same (e.g., $5/product unit). In an alternate embodiment, the plurality of product units are unequal product units and the offer price is assigned for each of the product units based, at least in part, on a size of the product unit. A larger product unit will cost more and a smaller product unit costs relatively less than the larger product unit. For example, a large product unit is sold at an offer price of $20/product unit and $10/product unit is offered for the smaller product unit.

Additionally, the purchase event includes product related information, such as, product category, product specifications, seller information, etc., In some embodiments, the seller 102 may provide a snippet, hint, puzzle or clue corresponding to the hidden information (i.e., product) for increasing demand or buy probability of the group of buyers.

"Group buying" as described herein refers to collective buying of product units so as to increase probability of accessing information/product. Group buying offers access to products at significantly reduced prices on the condition that a minimum number of buyers would make the purchase. However, it shall be noted that each buyer of the group of buyers is provided access to the information only when all product units (i.e., shares) associated with the product are sold. Moreover, the information that the buyers can access is concealed and purchase of a product unit does not provide the buyer a right to own the product or product unit physically.

In group buying, a buyer (e.g., the buyer 132) interested in the information may provide a user input for purchasing one or more product units of the plurality of product units associated with the product. For example, an access code for utilizing a software code that performs speaker identification is listed for sale in the purchase event. The seller 102 indicates a predefined purchase price of $1000 for the access code. Additionally, the seller also specifies 100 product units with an offer price of $10/product unit. Accordingly, buyers can purchase one or more product units from the 100 product units within a given time frame to reveal the access code. For example, the buyer 132 purchases 5 product units and other buyers who may be interested in the access code join together in purchasing the remaining product units (i.e., 95 product units) within the expiration time.

In some embodiments, the event management engine 220 is configured to receive a sale parameter change request from the seller 102 to update the purchase event. More specifically, the seller 102 can modify one or more sale parameters of the purchase event. For example, the seller 102 can modify the event expiration time and/or offer price/product unit. Accordingly, a sale parameter change request includes at least a primary sale parameter/initial sale parameter (e.g., offer price/product unit: $4/product unit) and a secondary sale parameter/modified sale parameter (e.g., offer price/product unit: $8/product unit).

In an embodiment, the event management engine 220 is configured to compare a current time with the event expiration time for determining an event status. More specifically, the event management engine 220 determines if the time period of the purchase event has expired. When the time period of the purchase event has expired, the event status is updated as an event complete status in the purchase event. It shall be noted that the event status can be modified by the seller 102. The seller 102 can choose to prematurely terminate the purchase event or extend time period of the purchase event. For instance, if all product units associated with the product are not sold, then the seller 102 may choose to extend the event expiration time. In some example embodiments, the seller 102 can modify offer price of unsold product units when the event expiration time is extended. The event management engine 220 is configured to automatically take down a product listed for sale when the event status indicates event complete status. However, it shall be noted that the seller 102 can choose to re-post the product if all product units have not been sold.

It shall be noted that the sale parameters used here are for example purposes only and embodiments of the present disclosure can be practiced on fewer or more sale parameters than those described here.

Thereafter, the event management engine 220 is configured to determine a sale status of purchase event associated with the product at preset intervals. More specifically, a number of sold product units among the total number of product units is determined at specific time instants (e.g., every 5 minutes). Further, the event management engine 220 is configured to compare the total number of product units with a number of sold product units. The sale status indicates a sale complete status if the total number of product units is equal to the number of sold product units. For example, assuming the purchase event has duration of 5 hours; the event management engine 220 is configured to determine a total number of product units sold every 5 minutes. In one example scenario, after 4 hours, if all product units (e.g., 100 product units) are sold, then the sale is complete indicating sale complete status. It shall be noted that the event management engine 220 may either remove the listing of the product if all product units of the product are sold prior to the event expiration time or the product listing appears to buyers with the sale complete status till the event expiration time. However, no buyer can purchase any product unit associated with the product after the sale status indicates sale complete status.

The validation engine 222 includes suitable logic and/or interfaces for validating the product sale request from the seller 102. Validation is performed to determine content accuracy of the product prior to display of the purchase event. The validation engine 222 is configured to receive evidence records from the seller 102 for verifying the product sale request. The evidence record may include, but not limited to, textual content (e.g., printed or hand written), recorded media content (e.g., voice or video), photographs, live demonstration, or any combination thereof for proof of information accuracy. For example, if the information relates to a new project of a business establishment, the business establishment may provide plan documents, Memorandum of Understandings (MoUs), landscape material, etc., as evidence records.

In one embodiment, the product sale request and the evidence records are shared with an expert committee that determines if the information is accurate based on the evidence records. In some example embodiments, the buyers (e.g., the buyer 132) who participate in the group purchase of the product can also validate the accuracy of the information after purchase. For example, the buyer 132 will have an option to provide a vote (upvote/downvote) to provide a feedback on the content accuracy of the information that was purchased by the buyer 132. It shall be noted that the validation of the product sale request and/or product has been explained for example purposes and the server system 200 may employ different techniques to ensure the accuracy of the information prior to listing the product for sale.

The dynamic pricing engine 224 includes suitable logic and/or interfaces for dynamically adapting offer price of product units associated with a product. More specifically, the dynamic pricing engine 224 is configured to determine a product popularity among buyers for dynamically revising offer price of product units. In one embodiment, a product popularity score is calculated to determine popularity of the product. The dynamic pricing engine 224 is configured to track at least one of a trending product, a recently introduced product, products in categories preferred by a plurality of buyers, an event expiration product and seller popularity. In one non-limiting example, the products may be ordered/arranged based on maximum product units sold in past one hour. The product associated with most product units sold in the past hour is given a popularity score (e.g., 10) on a scale of 10 and remaining products are assigned a score based on the order/arrangement. Similarly, the product may be rated on different product attributes (e.g., recently introduced product, preferred product category, seller popularity, etc.). Accordingly, a weighted average of the scores based on different product attributes gives the popularity score of the product.

In an embodiment, the dynamic pricing engine 224 is configured to adapt offer price of unsold product units among the plurality of product units associated with the product based on the popularity score. For example, the seller 102 (e.g., an actor) initially defines offer price for 100 product units associated with a product (e.g., plot of a movie project) at $10 per product unit. However, the actor being a most followed celebrity, the product units are sold quickly, for example, 70 product units are sold in the past hour thereby indicating that the product has a high demand (i.e., popularity) as shown by the popularity score of the product. Accordingly, the dynamic pricing engine 224 calculates a revised offer price for unsold product units (i.e., 30 product units) in real-time based on the popularity score and displays the same for prospective buyers who intend to join together for the group purchase of the product.

The transaction management engine 226 includes suitable logic and/or interfaces for managing payment transactions of the product/product units. The transaction management engine 226 is configured to determine a total cost for the product units selected by the buyer 132 based on the user input. Further, the transaction management engine 226 is configured to facilitate receipt of at least a part payment for the product units purchased by the buyer. The buyer 132 may make part payments using debit cards, credit cards, e-wallets, bank transfers, electronic cheques, mobile credit, bitcoin, etc. Further, when the sale status associated with the purchase event indicates sale complete status, the transaction management engine 226 calculates a transaction amount that was collected by selling the product units of the product to a group of buyers. The transaction amount is an aggregation of part payments made by the group of buyers to purchase access to the information listed by the seller 102. In other words, the transaction amount refers to amount collected by sale of total number of product units (i.e., purchased product units) associated with the product. In one example, assuming the predefined price for 100 product units associated with a product as $1000 and if all 100 product units associated with a product are sold at $10/product unit within the event expiration time, then the transaction amount collected is $1000 (100 product units*$10=$1000). In another example, assuming the predefined price for 200 product units associated with a product as $2000 and if product units are initially sold at $10/product unit and after sale of 150 product units (150 product units*$10=$1500), the product units are offered at $20/product unit based on demand. Therefore, the remaining 50 product units are sold for $1000, then the transaction amount is $2500 (i.e., 150 product units*$10+50 product units*$20=$2500).

Moreover, a processing fee is deducted from the transaction amount by the transaction management engine 226 for facilitating sale of the product to the group of buyers. The processing fee is usually an amount agreed by the seller 102 for facilitating the purchase event (i.e., sale of product). The transaction management engine 226 is configured to calculate a payment amount for the seller based at least in part on the processing fee and the transaction amount. The processing fee is deducted from a total amount (i.e., transaction amount) collected by selling product units of a product to determine the payment amount. Further, the transaction management engine 226 is configured to process the payment amount to the seller 102. The payment amount is processed to the seller 102 when the purchase event is complete. Alternatively, the payment amount is processed to the seller 102 only after providing an access key to the buyers who participated in the group purchase of the product. Specifically, when the group of buyers validates content accuracy of the product, the payment amount is provided to the seller 102. In one example, the product is an access code for a software program and when the event status indicates complete, the access code is shared with the group of buyers. The group of buyers may provide a feedback (e.g., vote) indicating that the software program performs as quoted by the seller 102 in the purchase event, then the transaction management engine 226 processes the payment amount to the seller 102.

It shall be noted that if the sale status indicates a sale incomplete status, the part payment collected from each of the group of buyers who purchased one or more product units of the product are refunded and the information (i.e., product) is not revealed to the buyers. However, the seller 102 may choose to re-post the product for sale with revised offer price/product unit.

The access key management engine 228 includes suitable logic and/or interfaces for managing access key to different products. In one embodiment, the buyer 132 provides a buyer preference for receiving access key for the product. The access key can be in the form of a photo, a document, an audio or video recording, a URL, an access code, a date and time in the past or the future, doing an action, not doing an action, a blockchain block, or any other form of information. For example, the access key may be a secret code that provides only group of buyers who purchased product units access to the information. The buyer preference indicates a preferred method of receiving the access key for information. Examples of buyer preference include, but not limited to, an Electronic mail (Email), a Short Message Service (SMS), a social networking handle, a printed document, and a voice message. For example, if the buyer 132 purchases a product unit associated with a product (e.g., secret formula) and provides buyer preference as Email, then the secret formula is shared via Email or an access code for viewing the secret formula is shared with group of buyers who purchased product units.

In another embodiment, the buyer can provide one or more buyer preferences for receiving the access key. The access key management engine 228 provides the access key via one of the buyer preference method based on a total number of product units purchased by the buyer. More specifically, the access key management engine 228 is configured to select a buyer preference from the one or more buyer preferences based on the total number of product units purchased by the buyer. For example, the buyer 132 who bought 20 product units of a product (e.g., circuit design) may provide buyer preferences as, Email, printed document and the access key management engine 228 on determining that the buyer 132 has bought maximum product units among other buyers who participated in the group purchase provides the circuit design or access key to the circuit design instantly via email. In an alternate embodiment, a buyer who purchased more product units is given earlier access to the information than a buyer who purchased relatively less product units.

In one embodiment, the access key management engine 228 is configured to send the access key associated with a product to the group of buyers when the sale status indicates a sale complete status. More specifically, when the event management engine 220 determines that all product units associated with the product are sold before the event expiration time, the access key is shared with the group of buyers. In another embodiment, the access key management engine 228 is configured to send the access key associated with a product to the group of buyers when the event status indicates an event complete status. In other words, even if all product units of the product are sold prior to the event expiration time, the access key for the product is shared with the group of buyers only after the event expiration time. More specifically, even if the sale status indicates a sale complete status, the access key is shared with group of buyers only after the event status indicates event complete status at the event expiration time.

Some non-exhaustive example embodiments of group purchasing of information are described with reference to FIGS. 3A-3C to 8.

Figure 3A:
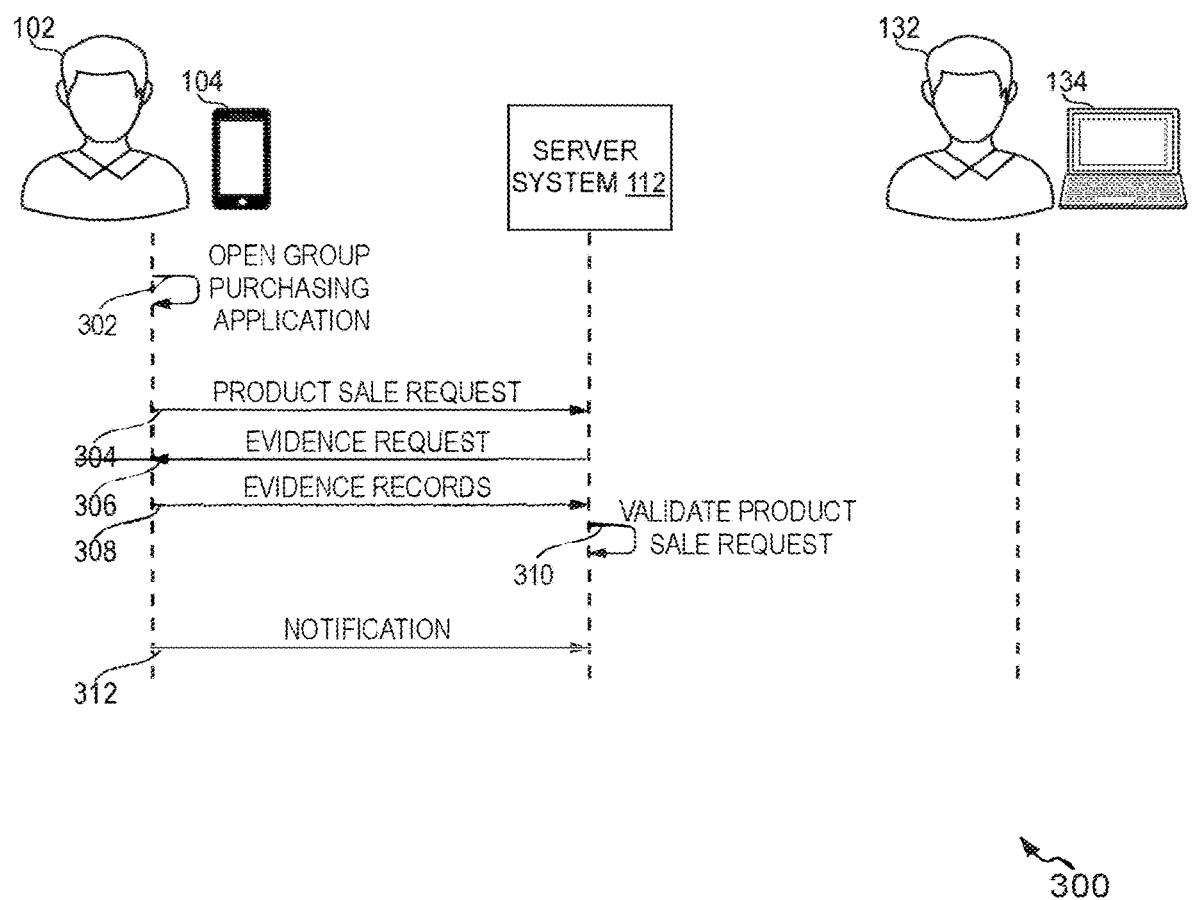
FIG. 3A illustrates a sequence flow diagram representing a method for listing a product for sale, in accordance with an embodiment of the present disclosure.

FIG. 3A illustrates a sequence flow diagram representing a method 300 for listing a product for sale, in accordance with an embodiment of the present disclosure. The seller 102 logs in to a web application or a mobile application (i.e., group purchasing application) associated with the server system 112 on the seller device 104 for selling a product.

At 302, the seller 102 opens the group purchasing application associated with the server system 112 on the seller device 104. In an embodiment, the group purchasing application may be downloaded from the server system 112 and installed on the seller device 104 therein. In some forms, after downloading of the group purchasing application, an application icon may be displayed to the seller 102 on the display screen of the seller device 104. The seller 102 may provide a selection input on the application icon to invoke the group purchasing application. The group purchasing application, after invoking, may present one or more UIs for creating a seller account of the seller 102. The group purchasing application may present a UI for posting a product for sale in the group purchasing application.

At 304, the seller 102 sends a product sale request to the server system 112. The product sale request includes a product description, a product category, a seller information and the plurality of sale parameters. For example, if a renowned scientist intends to disclose a chemical equation (i.e., the product) for preparing a distinct material, the product sale request includes a description of the distinct material (e.g., properties, uses, etc.), a product category (e.g., science), information related to the scientist (e.g., name, awards, credentials, research area, etc.), number of shares/product units, predefined price for the product, offer price per product unit, etc., At 306, the server system 112 requests evidence for determining authenticity of the product. At 308, the seller 102 sends evidence records associated with the product to the server system 112. The evidence record may include, but not limited to, textual content (e.g., printed or hand written), recorded media content (e.g., voice or video), log books, photographs, live demonstration, or any combination thereof to support the information accuracy of the product.

At 310, the server system 112 validates the product sale request based on the evidence records. In one embodiment, the server system 112 may send the product sale request and the evidence records to an expert committee to determine authenticity of the records. The expert committee may conduct meetings with the seller, enquiries with the seller and other accomplices and/or refer to external databases to validate the authenticity of the product. If the product is not authentic, for example, the information already exists in public domain or known to a portion of the public, the product sale request is disposed.

At 312, the server system 112 sends a notification to the seller 102. The notification may include a message indicating authenticity check status of the product. Additionally or optionally, on successful validation of the product sale request, the notification includes tracking information associated with the product for the seller 102. The seller 102 can use the tracking information to view status/performance of the product. Moreover, the seller 102 can use the tracking information to update sale parameters (e.g., offer price/product unit, sale expiration time, etc.) associated with the product. An example of group purchasing the product listed by the seller 102 is shown and explained with reference to FIG. 3B.

Figure 3B:
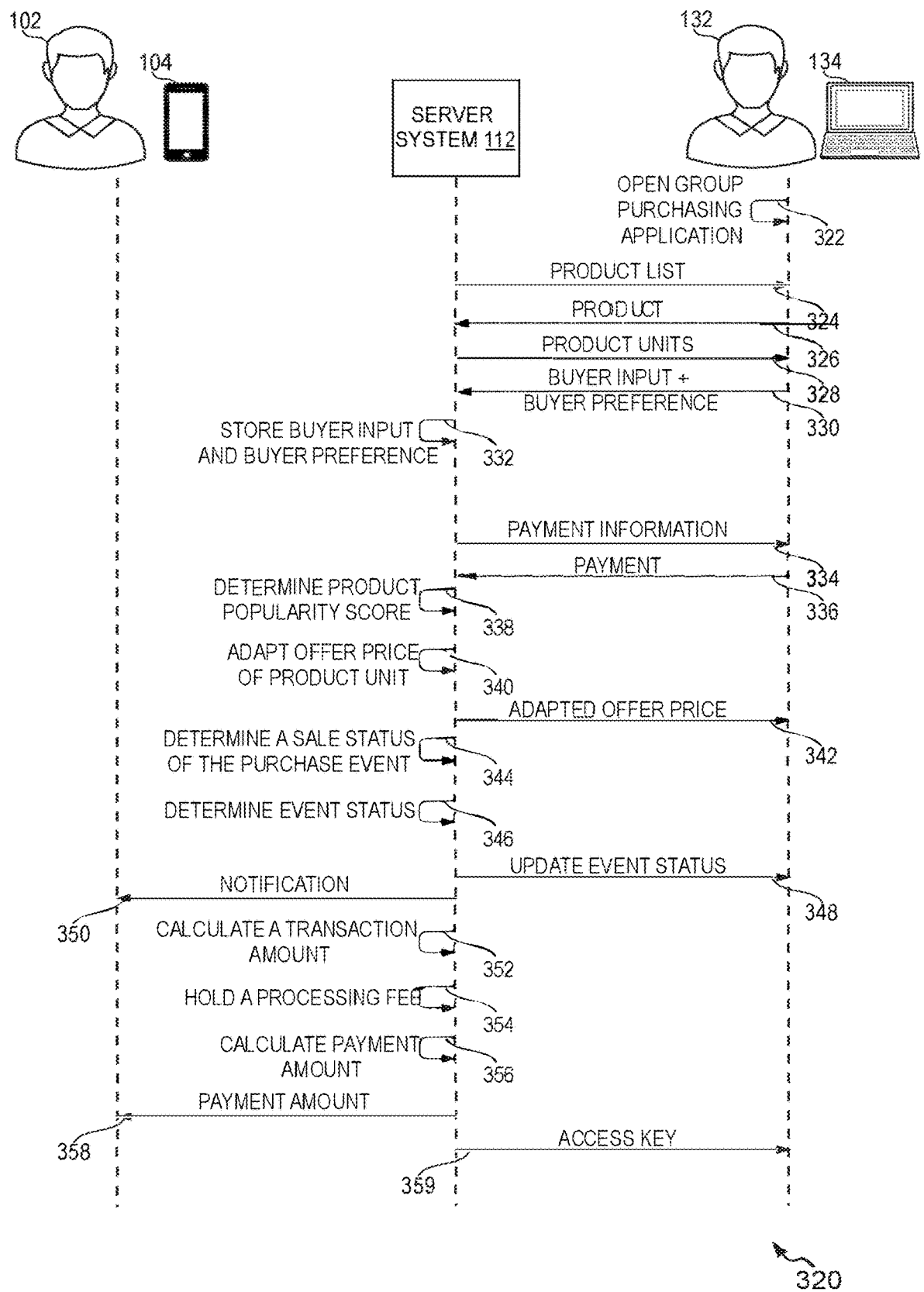
FIG. 3B illustrates a sequence flow diagram representing a method for group purchasing an access key for a product, in accordance with an embodiment of the present disclosure.

FIG. 3B illustrates a sequence flow diagram representing a method 320 for group purchasing an access key for a product, in accordance with an embodiment of the present disclosure. The buyer 132 logs in to a web application or a mobile application (i.e., group purchasing application) associated with the server system 112 on the seller device 104 to participate in a group purchase of a product.

At 322, the buyer 132 opens the group purchasing application associated with the server system 112 on the buyer device 134. In an embodiment, the group purchasing application may be downloaded from the server system 112 and installed on the buyer device 134 therein. In some forms, after downloading of the group purchasing application, an application icon may be displayed to the buyer 132 on the display screen of the buyer device 134. The buyer 132 may provide a selection input on the application icon to invoke the group purchasing application. The group purchasing application, after invoking, may present one or more UIs for creating a buyer account of the buyer 132. In some example embodiments, the creation of the user account may not be needed, and the user can access the application in a guest mode.

At 324, the server system 112 causes display of a product list in the buyer device 134. In general terms, the group purchasing application may present one or more UIs displaying a plurality of products listed for sale in various categories (e.g., entertainment, sports, science, technology, etc.)

At 326, the buyer 132 selects a product from the product list. The buyer 132 can filter and browse products based on categories, search strings or popular products. The buyer 132 provides a touch/click input on the product in the product list.

At 328, the server system 112 causes display of a plurality of product units associated with the product. Specifically, the server system 112 causes display of a purchase event associated with the product. The purchase event depicts a plurality of product units. The term product units as used herein refer to a virtual representation of total number of shares in the product. For example, a product price ($3000) is divided into smaller shares/units (e.g., 300 product units) and each share is priced at $10 per product unit. Accordingly, the product does not have a specified price but a weighted sum of the price of the shares/product units. The purchase event is governed by sale parameters specified by the seller. The sale parameters include, but not limited to, a predefined price for the product, an offer price for each product unit of the plurality of product units associated with the product, an event expiration time, etc. It shall be noted that the product details are hidden and not shown to the buyer/group of buyers 132 until all product units associated with the product are sold. Moreover, it shall be noted that purchasing a product unit does not confer on any rights on the buyer 132 to own the product. Alternatively, purchasing a product unit provides access to confidential/undisclosed information of the seller 102. In other words, purchasing a product unit of a product increases the probability of revealing the information to a group of buyers who purchase access to the information. An example of displaying product units of a product is shown and explained with reference to FIG. 4A.

At 330, the buyer 132 provides a buyer input and buyer preference for purchasing one or more product units and a mode for receiving access key, respectively. For example, the buyer 132 may provide the buyer input to purchase 3 product units associated with the product (e.g., playing 11 of a national cricket team). Further, the buyer 132 also provides one or more buyer preferences for customizing a communication mode for receiving the access key to the information purchased by the buyer 132. Examples of the buyer preference include, but not limited to, an electronic mail, a SMS, a social networking handle, a printed document, a phone call and a voice message (e.g., IVRS). When the buyer 132 selects multiple buyer preferences, the server system 112 may provide the access key based on total number of product units purchased by the buyer 132. For example, if the buyer 132 purchased more product units, he/she gets quick access to the information via a most preferred communication mode.

At 332, the server system 112 stores the buyer input and the buyer preferences.

At 334, the server system 112 shares payment information to the buyer 132. Specifically, the server system 112 calculates a total amount (i.e., part payment of the predefined price) payable by the buyer 132 for the product units purchased. For example, if offer price of a product unit is $15 and if the buyer 132 purchases 5 product units, the part payment by the buyer 132 is calculated as $75 (5*$15=$75).

At 336, the buyer 132 completes payment for the product units. In an example scenario, the group buying application (i.e., e-commerce website interface) prompts the buyer 132 to provide payment information such as, payment card number, name of the buyer and authorization key of the payment card for authorizing the transaction.

At 338, the server system 112 determines a product popularity score for the product at predefined intervals. The server system 112 tracks each product in the product list at predefined intervals (e.g., every 1 hour) to identify buyer trends. For example, the server system 112 computes a product popularity score for each product based on an attribute. The attributes may be a trending product, a recently introduced product, products in categories preferred by a plurality of buyers, an event expiration product and seller popularity. In some embodiments, the server system 112 performs a cumulative averaging of scores provided for products based multiple attributes to determine the product popularity score.

At 340, the server system 112 dynamically adapts the offer price of unsold product units associated with the product based on the product popularity score. For example, a product (e.g., plot and characters of a movie in production stage) is listed for sale on the group purchase application. The movie listed by a prominent director on the group purchasing application draws a lot of attention and attracts a lot of buyers. Assuming, 120 product units of 200 products are sold in an hour of listing the product, the product popularity score is high (e.g., 10 on a scale of 10). Accordingly, the server system 112 revises offer price for remaining product units (i.e., 80 product units). Moreover, it shall be noted that the seller 102 can also modify offer price of product units in real-time based on demand.

At 342, the adapted offer price is displayed for the buyer 132 on the group purchasing application. The new offer price is displayed for the unsold product units. More specifically, buyers who access the product to purchase product units now can purchase the product units at the revised offer price.

At 344, the server system 112 determines a sale status of the purchase event at preset intervals. In one embodiment, the server system 112 calculates at preset intervals (e.g., every half an hour) if a number of sold product units are equal to a total number of product units associated with the product to determine the sale status. If all product units associated with the product are sold before the event expiration time, the sale status is updated as sale complete status. It shall be noted that determining of the sale status is an iterative process and is performed till the event expiration time.

At 346, the server system 112 is configured to determine event status of the purchase event. The event status is determined by comparing a current time with the event expiration time. In one embodiment, the event status is complete when the current time exceeds the event expiration time specified in the sale parameter. More specifically, the server system 112 does not process sale of product units associated with the product after the event expiration time.

At 348, the server system 112 updates event status on the group purchasing application as event complete status. When the current time exceeds the event expiration time, the event status of the purchase event is updated with an event complete status, else the server system 112 continues to process sale of product units associated with the purchase event.

At 350, the server system 112 sends a notification to the seller 102 about the event status and the sale status.

At 352, the server system 112 calculates a transaction amount for the total number of product units sold via the group purchasing application. The transaction amount is cumulative of the part payments made by group of buyers for the total number of purchased product units associated with the product. It shall be noted that if the sale status indicates a sale incomplete status (i.e., if all product units are not sold), the part payments made by the group of buyers are refunded back to the group of buyers.

At 354, the server system 112 holds a processing fee for the group purchasing application for facilitating sale of the product. The processing fee (e.g., $200) is usually an amount agreed by the seller 102 for facilitating sale of the product.

At 356, the server system 112 calculates a payment amount for the seller 102. The payment amount is calculated after deducting the processing fee from the transaction amount. For instance, if the transaction amount is $3400 and the processing fee is $200, the payment amount for the seller is $3200 for selling the information.

At 358, the server system 112 facilitates processing of the payment amount for the seller 102.

At 359, the server system 112 sends the access key for the product to the group of buyers 132 who participated in group purchase of the product. It shall be noted that the operations 352-359 are performed only when the sale status indicates sale complete status and the event status indicates event complete status.

Figure 3C:
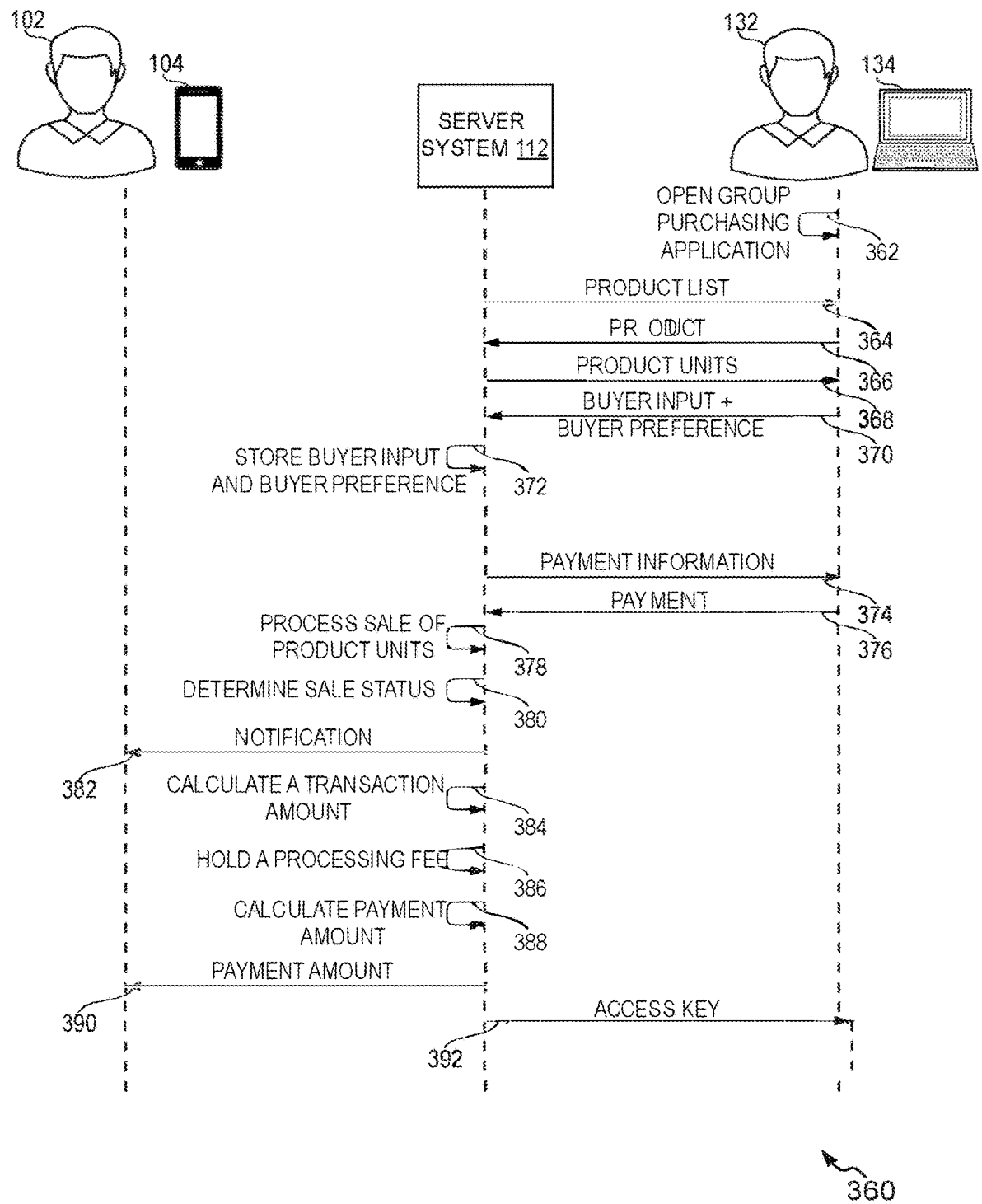
FIG. 3C illustrates a sequence flow diagram representing a method for group purchasing an access key for a product, in accordance with another embodiment of the present disclosure.

FIG. 3C illustrates a sequence flow diagram representing a method 360 for group purchasing an access key for a product, in accordance with another embodiment of the present disclosure.

At 362, the buyer 132 opens the group purchasing application associated with the server system 112 on the buyer device 134. At 364, the server system 112 causes display of a product list in the buyer device 134. At 366, the buyer 132 selects a product from the product list. At 368, the server system 112 causes display of a plurality of product units associated with the product.

At 370, the buyer 132 provides a buyer input and buyer preference for purchasing one or more product units and a mode for receiving access key, respectively. At 372, the server system 112 stores the buyer input and the buyer preferences. At 374, the server system 112 shares payment information to the buyer 132. The payment information refers to the part payment for the one or more product units purchased by the buyer. At 376, the buyer 132 completes payment for the product units.

At 378, the server system 112 processes sale of product units associated with the product.

At 380, the server system 112 determines a sale status of the purchase event at preset intervals. More specifically, at an instant (i.e., preset interval) if the server system 112 determines that all product units associated with the product are sold, the sale status is updated as sale complete status.

At 382, the server system 112 sends a notification to the seller 102 about the sale status.

At 384, the server system 112 calculates a transaction amount for the total number of product units sold via the group purchasing application. At 386, the server system 112 holds a processing fee for the group purchasing application for facilitating sale of the product. At 388, the server system 112 calculates a payment amount for the seller 102. At 390, the server system 112 facilitates processing of the payment amount for the seller 102.

At 392, the server system 112 sends the access key for the product to the group of buyers 132 who participated in group purchase of the product.

Figures 4A, 4B:
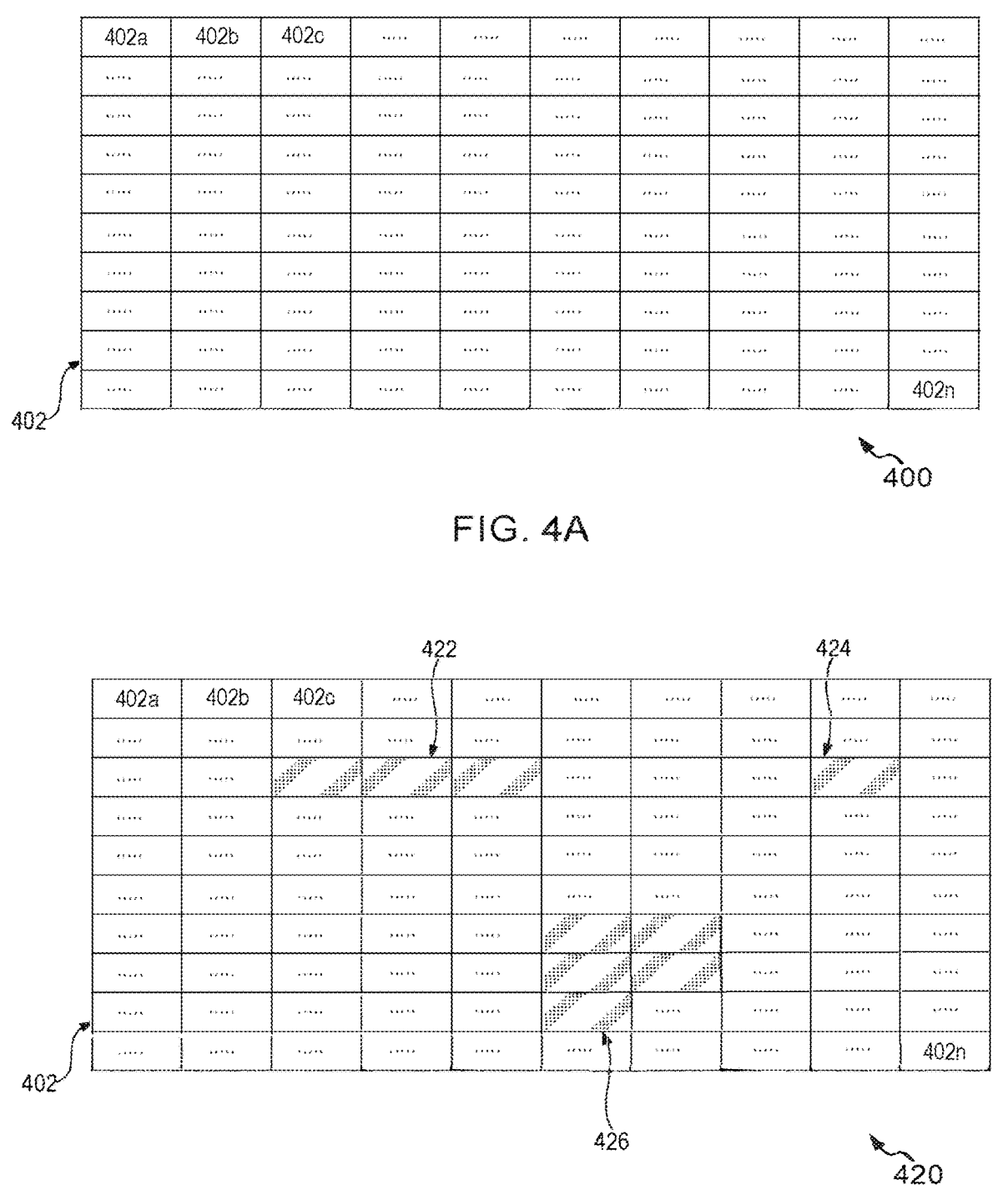

Referring now to FIG. 4A, an example representation of a purchase event 400 depicting a plurality of product units 402a, 402b, ..., 402n associated with a product is illustrated in accordance with an example embodiment of the present disclosure. The product is a secret information, for example, undisclosed or classified information owned by any individual. The owner of the product (i.e., seller) agrees to sell the product for a predefined price D. Moreover, the predefined price D is decomposed into smaller shares (i.e., 100 shares) that are referred to as product units 402a, 402b, ..., 402n, where 'n' is 100. In other words, the predefined price is sum of an offer price associated with each of the product units 402a, 402b, ..., 402n. Moreover, the product units 402a, 402b, ..., 402n are equal product units implying that the product units are equally priced, for example, offer price of product unit 402a and product unit 402b are the same. When a buyer buys a product unit, he/she does not possess any right over the product but increases a probability of revealing the information listed for sale by the seller. It shall be noted that owner of the product may indicate either a person or an organization with whom the information is related to or a reliable source of the information associated with a person/organization.

In this example representation, the product units 402a, 402b, ..., 402n are shown on a grid 402. More specifically, each product unit (e.g., 402a) is shown as a block in the grid 402 and is associated with an offer price (e.g., $10). The grid 402 indicates the predefined price D and a sum of the offer price associated with the product units 402a, 402b, ..., 402n is representative of the predefined price D for the product. A buyer may choose to buy one or more product units (e.g., 2 product units) by providing a user input (touch/click input) on preferred blocks to purchase product units (e.g., 402a,

402b). It is noted that the grid 402 is shown herein for illustration purposes and the product units 402a, 402b, . . . , 402n may be displayed in different forms than those depicted in FIG. 4A.

In one example, a UI displaying product units associated with the product may provide a data field where the buyer can provide keyboard inputs (i.e., user input) to indicate number of product units he/she intends to purchase. It shall be noted that the information is not concealed behind the grid 402 and purchasing of some product units does not reveal any portion of the information. The information is communicated to the group of buyers only after the sale status indicates completion. Moreover, it is noted that the product units are shown herein for illustration purpose and that the predefined price D may be decomposed to include more or fewer product units than those depicted in the grid 402 based on sale parameters specified by the seller.

Figure 4C:
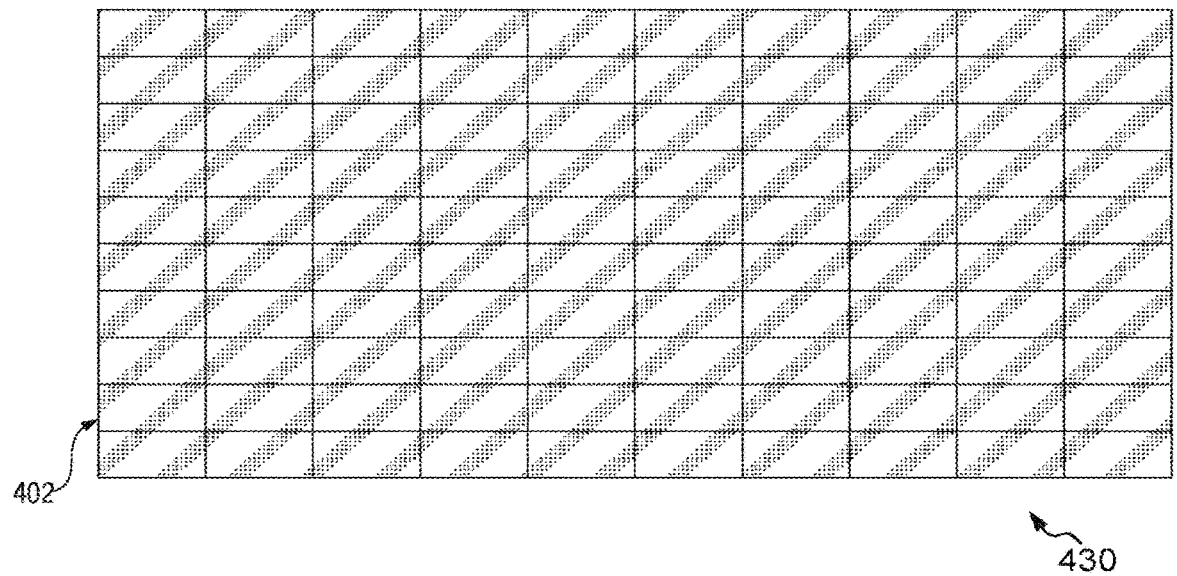
FIG. 4C is an example representation of an event complete status of the purchase event when the plurality of product units have been purchased by a group of buyers, in accordance with an example embodiment of the present disclosure.

Referring now to FIGS. 4B-4C, example representations 420, 430 depict a group of buyers (e.g., buyers $B_1$, $B_2$, $B_3$, $B_4$, $B_5$, . . . , $B_n$) purchasing product units associated with the product in the purchase event 400 illustrated in accordance with an example embodiment of the present disclosure. When the product is displayed for sale on an e-commerce website (i.e., the group purchasing application), buyers can start purchasing product units. The buyers (e.g., buyers $B_1$, $B_2$, $B_3$, $B_4$, $B_5$, . . . , $B_n$) can browse, search and select the product that causes display of the grid 402.

During the sale, the buyer $B_1$ purchases 3 product units (shown as 422), buyer $B_2$ purchases 1 product unit (shown as 424), buyer $B_3$ purchases 5 product units (shown as 426), and so forth as shown in FIG. 4B. At predefined intervals (e.g., 5 minutes) between start of the purchase event and an event expiration time $T_E$, the server system 200 determines a sale status of the purchase event. The sale status is determined by comparing total number of product units with number of sold product units. In this example representation, the product units that are bought by buyers $B_1$, $B_2$, $B_3$ at a time instant $T_1$ (i.e., 5 minutes after start of the purchase event) are highlighted. More specifically, at the time instant T1, the group of buyers $B_1$, $B_2$, and $B_3$ together have purchased 9 product units of the 100 product units depicted on the grid 402. The sale status is sale incomplete status as the total number of product units (i.e., 100 product units) does not equal to the number of sold product units (i.e., 9 product units). The buyers $B_1$, $B_2$, $B_3$ make part payments corresponding to total number of product units purchased by respective buyers.

In some example embodiments, the offer price per product unit is dynamically adapted by the server system 200 based on a product popularity score. Alternatively, the seller can modify (i.e., increase/decrease) offer price of unsold product units at his/her discretion during the sale (i.e., before the event expiration time $T_E$). For example, after a time period (e.g., time period $T_1$) the server system 200 identifies that demand for the product is high and therefore dynamically recalculates offer price per product unit based on predefined mathematical expression to revise offer price of unsold product units.

At time instant $T_{20}$ (i.e., 1 hour 40 minutes) after start of the purchase event, the server system 200 determines sale status of the purchase event. In this example representation, all product units 402a, 402b, . . . , 402n on the grid 402 have been purchased by a group of buyers (e.g., buyers $B_1$, $B_2$, $B_3$, $B_4$, $B_5$, . . . , $B_{40}$) thereby indicating the sale status as complete. In one embodiment, when all the product units are sold, the information is shared to the group of buyers (e.g., buyers $B_1$, $B_2$, $B_3$, $B_4$, $B_5$, . . . , $B_{40}$). In another embodiment, the information is shared with the buyers only after the event expiration time (i.e., on determining the event complete status). The information is sent to the group of buyers (e.g., buyers $B_1$, $B_2$, $B_3$, $B_4$, $B_5$, . . . , $B_{40}$) based on a buyer preference (e.g., email, SMS, IVRS, etc.). More specifically an access key (e.g., access code, password, authentication key) for the information is provided to the group of buyers (e.g., buyers $B_1$, $B_2$, $B_3$, $B_4$, $B_5$, . . . , $B_{40}$). It shall be noted that a UI displaying the product for sale includes different fields, for example, product category, product description, total number of product units, predefined price for the product, offer price per product unit, etc., and have not been shown for the sake of brevity.

Figure 4D:
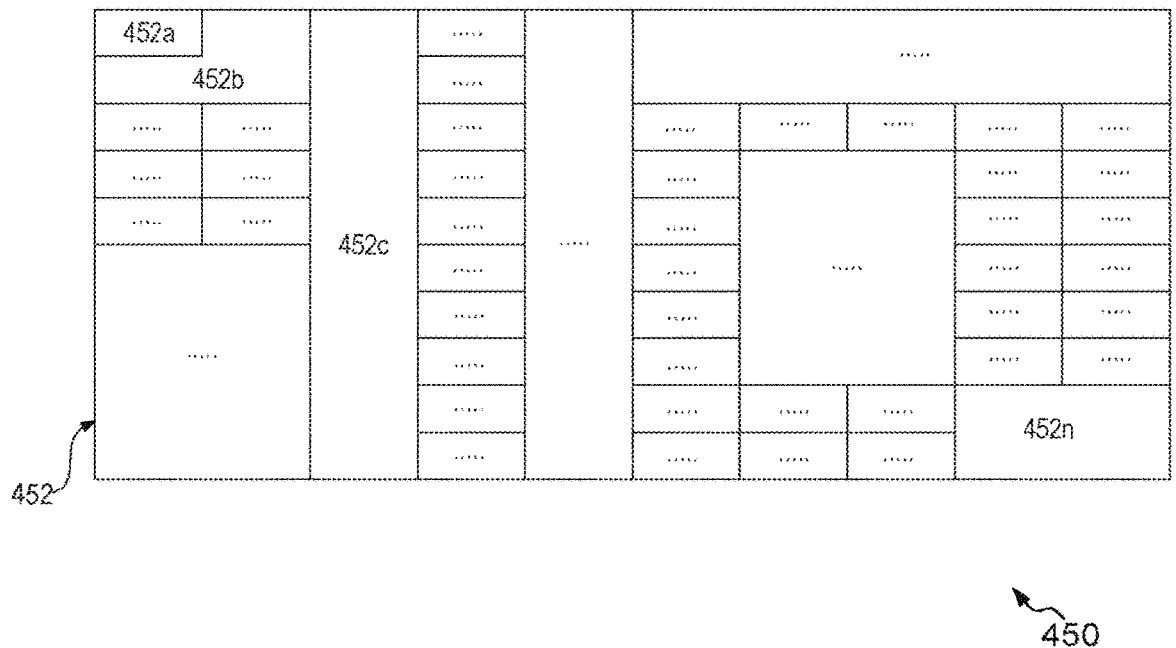
FIG. 4D is an example representation of a purchase event depicting a plurality of product units associated with a product, in accordance with another example embodiment of the present disclosure.

FIG. 4D is an example representation of a purchase event 450 depicting a plurality of product units 452a, 452b, 452c . . . , 452n associated with a product, in accordance with another example embodiment of the present disclosure. The product units 452a, 452b, 452c . . . 452n (where n is 50 product units) are unequal product units.

In this example representation, the purchase event 450 depicts the product units 452a, 452b, 452c . . . , 452n as unequal blocks on the grid 452. More specifically, two or more blocks of the grid 402 are conjoined together to create a single block. As the blocks are unequal, each product unit is associated with an offer price based on size of the block. For example, the product unit 452a is assigned an offer price of $10 whereas the offer price for the product unit 452c is specified as $100. It shall be noted that 10 shares of the grid 402 are combined together as a single share 452c (i.e., product unit) and hence the product unit 452c has the offer price of $100 which is the aggregation of the 10 shares. This enables a buyer of the group of buyers who wants to purchase more product units as a single product unit (e.g., product unit 452c). As already explained, the initial offer price is specified by the seller and may be adapted dynamically based on demand or by the seller.

It shall be noted that number of product units purchased by a buyer has no effect on the information being revealed to the group of buyers. In other words, all buyers of the group of buyers have access to the same information. However, buyers who purchase more units may receive early access to the information or the information may be delivered by a buyer preference method specified by the buyer.

Moreover, it shall be noted that the example representation of the purchase event 400 shown in FIG. 4A is exemplary and only provided for the purposes of explanation. In practical, the purchase event may include lesser or more product units associated with the product with fixed/dynamic pricing of the product units than those depicted in FIGS. 4A-4C.

In an embodiment, the server system 200 causes display of one or more user interfaces (UIs) on the buyer device 134 via an e-commerce website for facilitating sale of information (e.g., classified or undisclosed). Example UIs displayed to the buyer 132 for purchasing access to an information are shown in FIGS. 5A-5B.

Figure 5A:
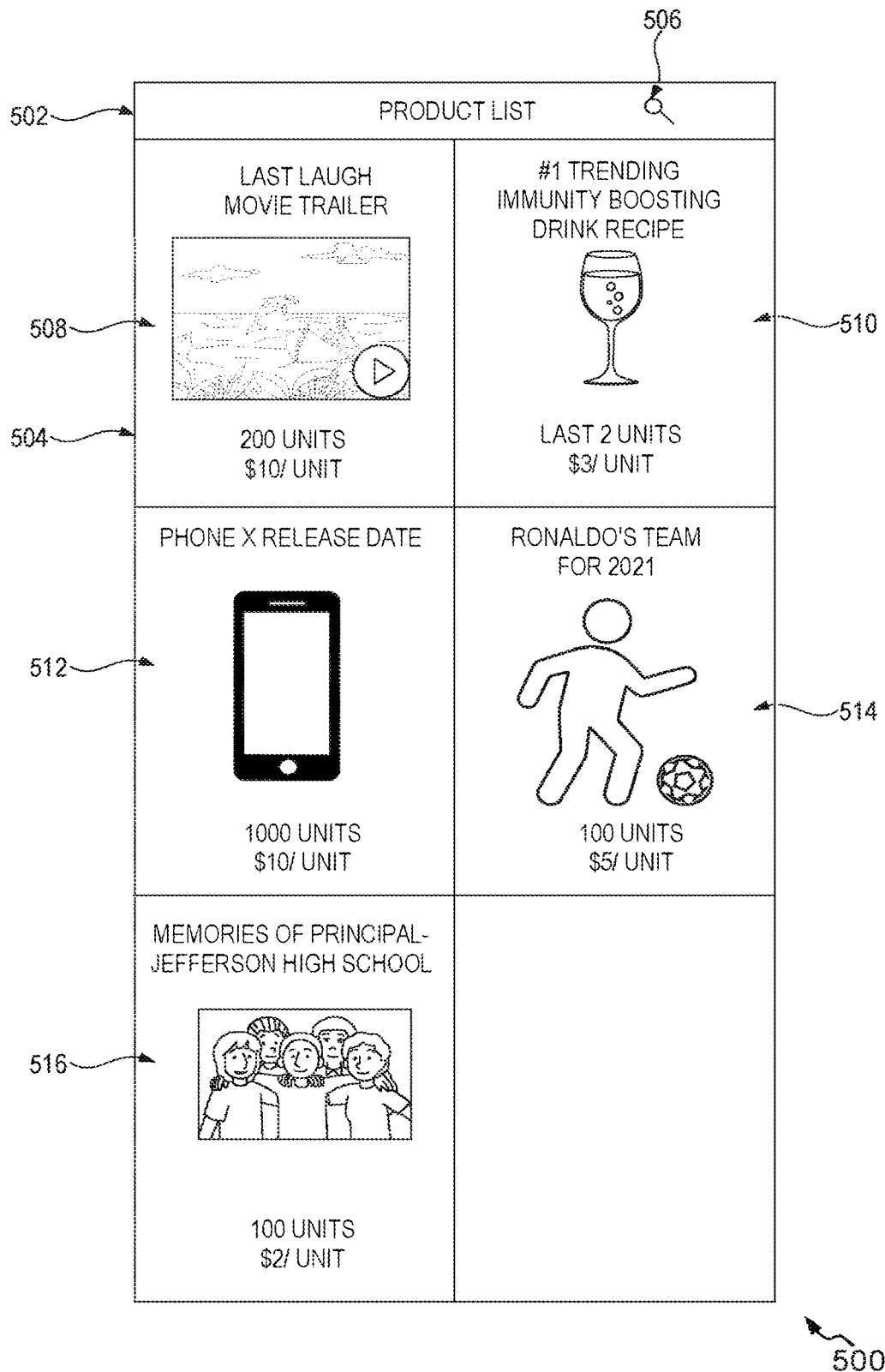
FIG. 5A shows an example representation of a UI displayed to a buyer on a display screen of a buyer device by an e-commerce website depicting a product list, in accordance with an example embodiment of the present disclosure.
Figure 5B:
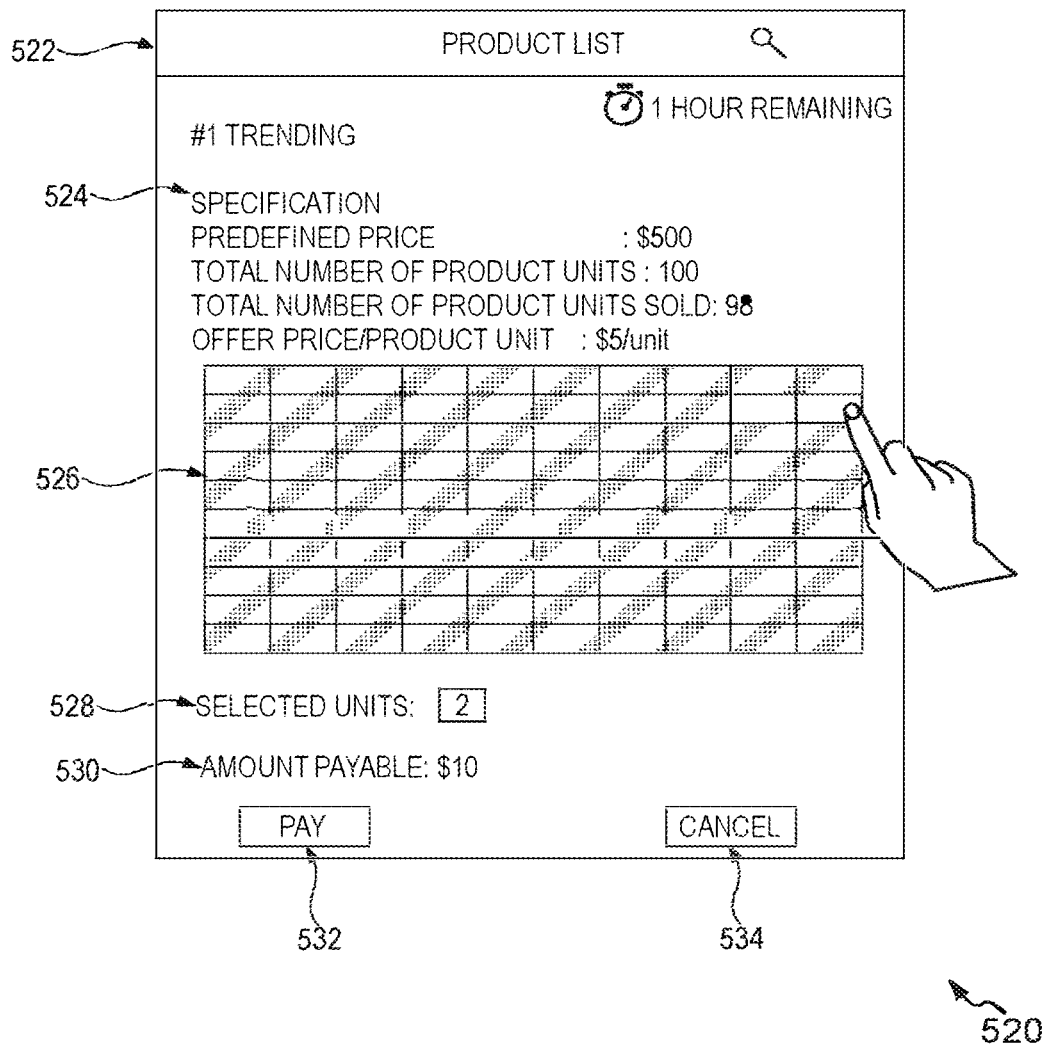
FIG. 5B shows an example representation of a UI displayed to a buyer on a display screen of a buyer device by the e-commerce website for receiving user input related to purchasing one or more product units of the plurality of product units associated with the product, in accordance with an example embodiment of the present disclosure.

FIG. 5A shows an example representation of a UI 500 displayed to a buyer (e.g., the buyer 132) on a display screen of the buyer device 134 by an e-commerce website (e.g., the group purchasing application) depicting a product list 504, in accordance with an example embodiment of the present disclosure. The buyer device 134 is an example of an electronic device 800 shown and explained with reference to FIG. 8. In at least example embodiment, the UI 500 is presented by the group purchasing application. The group purchasing application is a software application facilitated by the server system 112.

In an example scenario, after downloading the group purchasing application from the server system 112 (shown in FIG. 1), an application icon may be displayed to the buyer 132 on a display screen of the buyer device 134. The application icon is not shown in FIG. 5A. The buyer 132 may provide a selection input on the application icon to invoke the group purchasing application. The group purchasing application, after invoking, may present one or more UIs (e.g., the UI 500) for registration of the buyer 132/the seller 102 (i.e., creating a user account) with the group purchasing application.

The UI 500 is depicted to include a header portion and a content portion. The header portion 502 is depicted to exemplarily display a title associated with text 'PRODUCT LIST' and an option 506. The option 506 enables the buyer 132 to search for a specific product or products related to a specific category by use of a search string.

The content portion of the UI 500 is depicted to display the product list 504 depicting a plurality of products in different categories (e.g., entertainment, science, technology, business, food, etc.). In this example representation, products 508, 510, 512, 514 and 516 are depicted in the product list 504. The buyer 132 can scroll down/up to view the entire list of products in the group purchasing application. The product 508 is a movie trailer associated with text 'LAST LAUGH', the product 510 is a recipe associated with text 'IMMUNITY BOOSTING DRINK RECIPE', the product 512 is a release data of a phone associated with text 'PHONE X RELEASE DATA', the product 514 is a team information of a player associated with text 'RONALDO'S TEAM FOR 2021' and the product 516 is an old photograph of a prominent person associated with text "MEMORIES OF PRINCIPAL-JEFFERSON HIGH SCHOOL". Moreover, the product list 504 of products 508, 510, 512, 514 and 516 also includes sale parameters, for example, total number of product units, offer price per product units, etc., Additionally or optionally, products with high popularity score are highlighted or shown in the product list, for example, the product 510 is associated with text '#1 TRENDING' indicating that the product has a high demand (i.e., product popularity).

The buyer 132 may provide a touch/click input to select a product among the plurality of products in the product list 504. It is noted that the provisioning of the product list is explained herein for illustration purposes and may not be considered as limiting the scope of the disclosure.

FIG. 5B shows an example representation of a UI 520 displayed to the buyer 132 on a display screen of the buyer device 134 by the e-commerce website for receiving user input related to purchasing one or more product units of the plurality of product units associated with the product (e.g., the product 510), in accordance with an example embodiment of the present disclosure. The UI 520 may be presented on the buyer device 134 in response to the click input/touch received on the product 510 shown in the product list 504 of FIG. 5A.

The UI 520 is depicted to display a header portion 522 depicted to include a title associated with text 'IMMUNITY BOOSTING DRINK'.

The content portion of the UI 520 includes text 524 specifying sale parameters as shown below:
1. "PREDEFINED PRICE: $300
2. TOTAL NUMBER OF PRODUCT UNITS: 100
3. TOTAL NUMBER OF PRODUCT UNITS SOLD: 98
4. OFFER PRICE/PRODUCT UNIT: $5/unit"

The content portion also displays a grid 526 depicting the plurality of product units as smaller blocks. In this example representation, 98 of the 100 product units have already been purchased by buyers and the buyer 132 provides user input to select two blocks (i.e., two unsold product units). The UI 520 also includes fields 528, 530. The field 528 is associated with text 'SELECTED UNITS' and displays a total number of product units selected by the user input (e.g., 2 product units) and the field 530 is associated with text 'AMOUNT PAYABLE' indicating a total price (i.e., $10) for the product units selected by the buyer 132.

The content portion of the UI 520 is further configured to depict a tab 532 associated with text 'PAY' and a tab 534 associated with text 'CANCEL'. The buyer 132 may provide a touch or a click input on the tab 532 to pay and purchase product units associated with the product 510. The buyer 132 may be presented a payment page for processing the transaction on selecting the tab 532. The buyer 132 may decline the transaction by providing a click/touch input on the tab 534. It shall be noted that the UI 520 may include lesser or more fields and/or product information than those depicted in FIG. 5B.

FIG. 5C shows an example representation of a table 550 maintained at the server system 200 depicting dynamic adapting of offer price of unsold product units among a plurality of product units, in accordance with an example embodiment of the present disclosure. As mentioned previously, the server system 112 tracks a product to determine product popularity score. The product may be tracked based at least on a trending product, a recently introduced product, products in categories preferred by a plurality of buyers, an event expiration product and seller popularity. The table 550 includes a plurality of data field columns such as, but not limited to, product ID 552, product name 554, total product units 556, product units sold in past 1 hour 558, popularity score 560, offer price/product unit 562, and adapted offer price/product unit 564. The offer price is adapted dynamically by the server system 200 based on a demand for the product (e.g., product units sold in the past one hour).

As an example, a row 570 depicts a product "PRODUCT 2" associated with a product ID "221" that includes "200 product units" with offer price per product unit of $20. In this example representation, a total of "50" product units associated with the product "PRODUCT 2" were sold in the past 1 hour and the popularity score of the product indicates "10" (on a scale of 10) as determined by the server system 200. Therefore, the server system 200 has dynamically adapted offer price/product unit of the product "PRODUCT 2" to "$25/product unit" from an initial offer price of "$20/product unit". The table 550 includes as many entries as the number of products listed for sale in the e-commerce website (i.e., group buying application).

Figure 6:
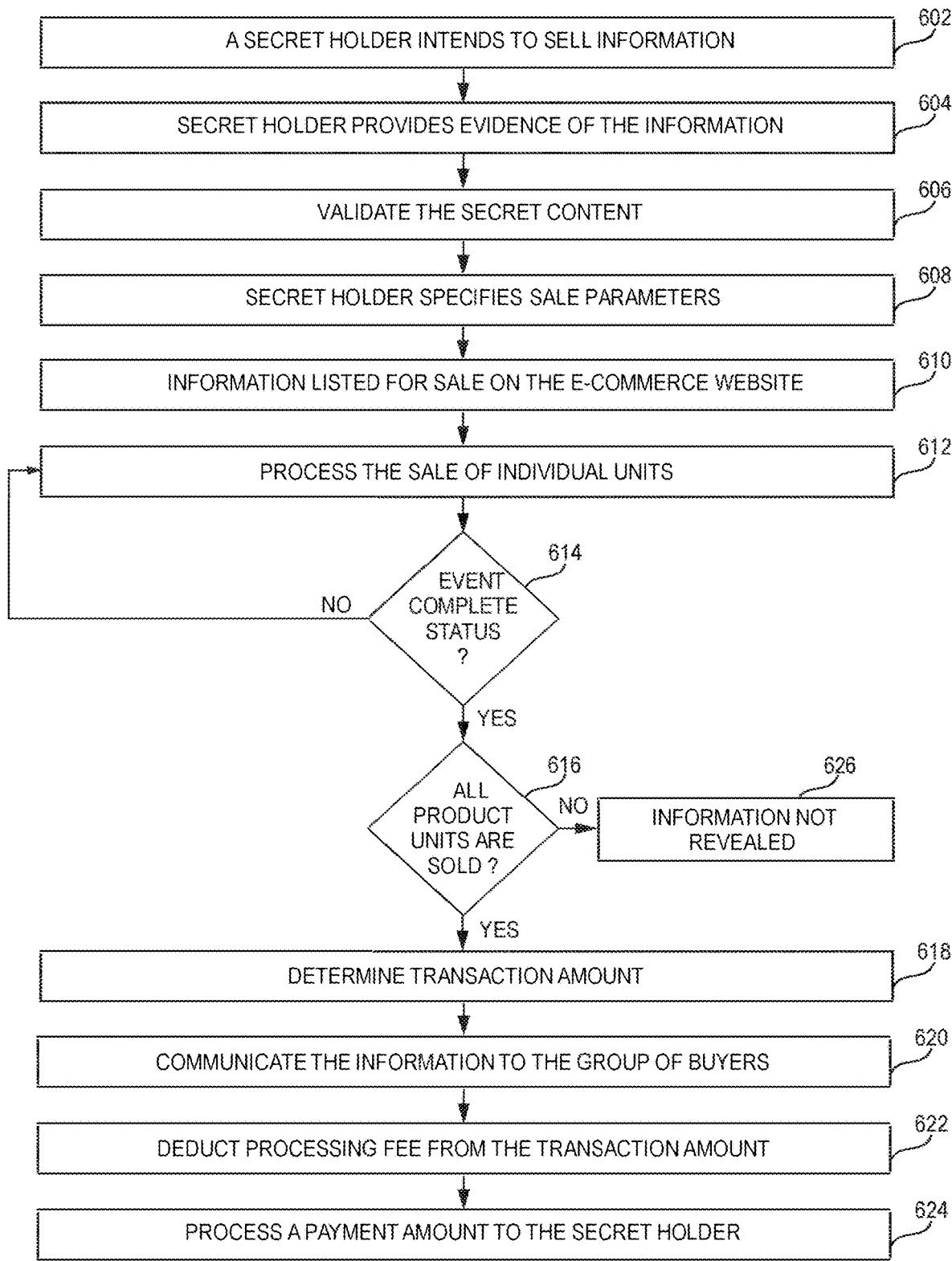
FIG. 6 represents a flow chart of a process flow for group purchase of information, in accordance with an embodiment of the present disclosure.

FIG. 6 represents a flow chart 600 of a process flow for group purchase of information, in accordance with an example embodiment of the present disclosure. The sequence of operations of the flow chart 600 may not be necessarily executed in the same order as they are presented. Further, one or more operations may be grouped and performed in form of a single step, or one operation may have several sub-steps that may be performed in parallel or in a sequential manner.

At 602, a secret holder (i.e., seller) intends to sell information (e.g., chemical equation). The information can be confidential or undisclosed information.

At 604, the secret holder provides evidence of the information (secret's content) to the server system 200. For example, the seller provides evidence in the form of lab observations, end product characteristics (e.g., proof of reactivity with other substances), etc., for the chemical equation.

At 606, the server system 200 validates the secret content. In one embodiment, an expert committee with expertise in the specific field (e.g., organic chemistry/material engineering) may verify the evidence records to determine authenticity of the information (e.g., chemical equation).

At 608, the secret holder specifies sale parameters. The sale parameters include a predefined price for the information, a total number of product units, an offer price per product unit, a period during which the sale is to be completed (i.e., a sale expiration time), a percentage increase in offer price of product unit based on popularity/demand, etc. More specifically, the predefined price (i.e., total price of the secret) is broken into smaller equal units referred to as the product units/shares. Each product unit has an offer price that is initially specified by the secret holder. The offer price of the product unit may be adapted dynamically during the sale either by the seller or the e-commerce website based on popularity/demand.

At 610, the server system 200 lists the information for sale on the e-commerce website (i.e., the group purchasing application) hosted and managed by the server system 200.

At 612, the server system 200 processes the sale of individual units (i.e., product units). A buyer can choose to buy one or more product units of the total number of product units. The buyer makes a part payment for the product units purchased on the e-commerce website. Similarly, group of buyers join together to purchase all the product units (i.e., the total number of product units) of the information.

At 614, the event status is determined. If a current time exceeds the event expiration time, the purchase event is terminated indicating an event complete status and operation 616 is performed, else step 612 is performed till the event status indicates the event complete status.

At 616, the server system 200 checks if all product units associated with a product are sold. More specifically, a sale status of the product is checked. The sale status is determined at predefined intervals (e.g., 5 minutes) to determine if the total number of product units is equal to the number of sold product units. The sale status is updated as sale complete status when all product units are sold to specify the sale of product units is complete (i.e., sale complete status). In general, the sale status is used to determine if the e-commerce website can reveal the information to the group of buyers who purchased product units associated with the information (i.e., access to information). It shall be noted that the sale status is determined at predefined intervals between start of the purchase event and the event expiration time. If the sale status indicates sale complete status, operation 618 is performed else operation 626 is performed.

At 618, the server system 200 aggregates total amount obtained by sale of product units to buyers (i.e., the group of buyers). More specifically, the server system 200 determines a transaction amount based on sales of the individual units to the group of buyers.

At 620, the server system 200 communicates the information (i.e., secret content) to the group of buyers at once via their preferred method of communication (i.e., buyer preference). More specifically, the server system 200 sends an access key for the information to the group of buyers based on the buyers' preference for receiving the information. Examples of the access key include, but not limited to, an access code, an image, a video, an audio message, etc.

At 622, the server system 200 deducts processing fee from the transaction amount for facilitating the sale of the information. In other words, the processing fee is deducted from total price obtained by sale of the product units.

At 624, the server system 200 processes a payment amount to the secret holder or any other organization he/she chooses. In one example, the server system processes a tax amount for the payment amount earned by the seller. Moreover, the seller may choose to transfer at least a part of the funds earned by sale of information to any organization (e.g., charity organization).

At 626, the information is not revealed. When the transaction amount is lesser than the predefined price, the sale status is an incomplete sale status. More specifically, if all product units of the information are not sold within the event expiration time to ensure the transaction amount is greater than or equal to the predefined price, the information is kept as a secret. Refunds or reversal of funds are issued to all buyers. Moreover, the seller may choose to re-post the information for sale with different sale parameters, for example, lesser offer price per product unit.

The sequence of operations of the method 600 need not be necessarily executed in the same order as they are presented. Further, one or more operations may be grouped together and performed in form of a single step, or one operation may have several sub-steps that may be performed in parallel or in sequential manner.

Figure 7:
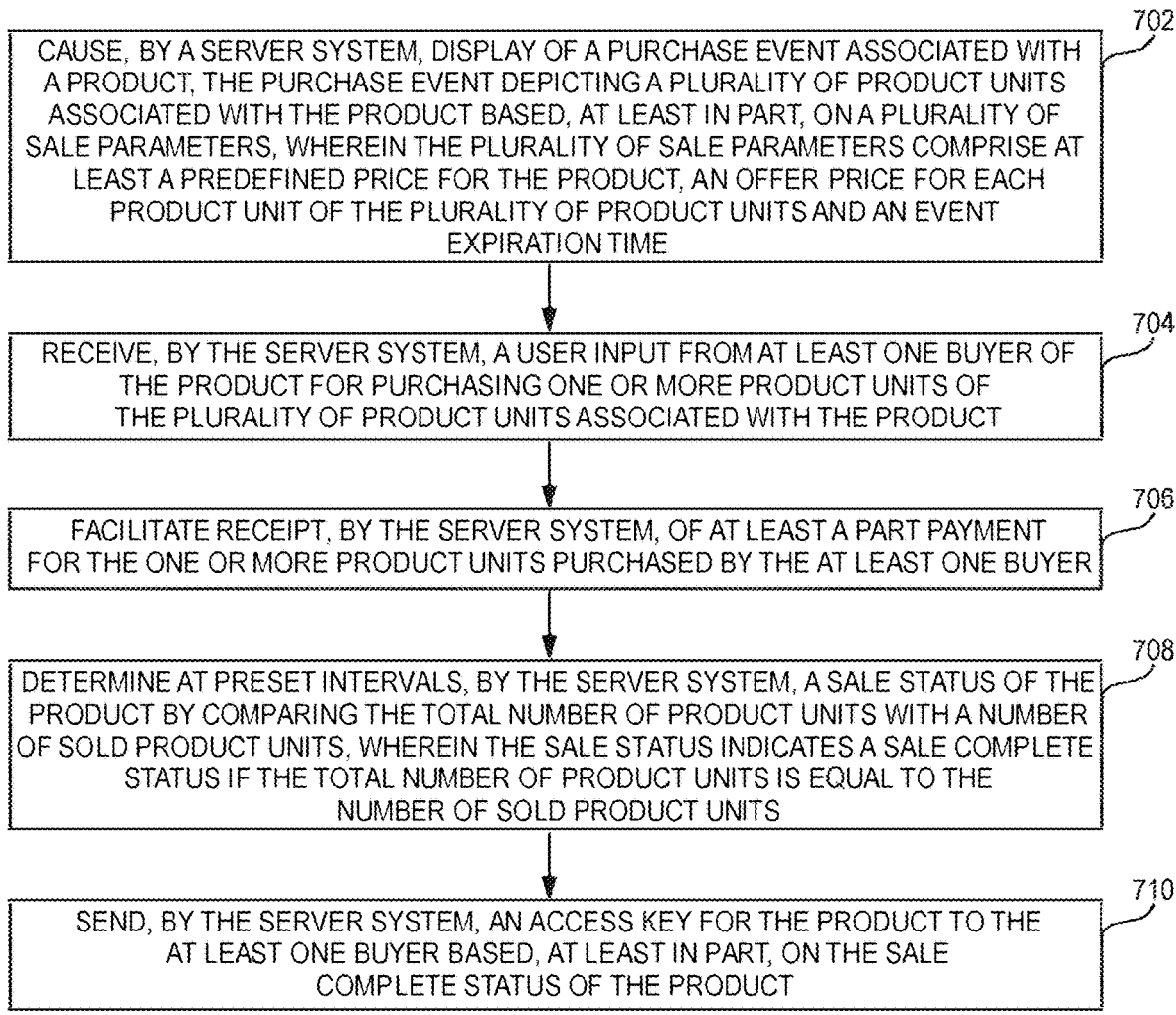
FIG. 7 represents a flow diagram of a method for group purchase of information, in accordance with another example embodiment of the present disclosure.

FIG. 7 represents a flow diagram of a method 700 for group purchase of information, in accordance with an example embodiment. The method 700 depicted in the flow diagram may be executed by the server system 112 or the server system 200 explained with reference to FIG. 2. Operations of the flow diagram of method 700, and combinations of operation in the flow diagram, may be implemented by, for example, hardware, firmware, a processor, circuitry and/or a different device associated with the execution of software that includes one or more computer program instructions. It is noted that the operations of the method 700 can be described and/or practiced by using a system other than these server systems. The method 700 starts at operation 702.

At operation 702, the method 700 includes causing display of a purchase event associated with a product. The purchase event depicts a plurality of product units associated with the product based, at least in part, on a plurality of sale parameters. The plurality of sale parameters include at least a predefined price for the product, a total number of product units, an offer price for each product unit of the plurality of product units and an event expiration time. For example, the predefined price X (e.g., $5000) of a product P (i.e., secret information) is decomposed to constitute 100 shares/product units ($P=\{p_1, p_2, p_3, \ldots, p_{100}\}$) and each product unit is sold at an offer price of $50/product unit.

At operation 704, the method 700 includes receiving user input from at least one buyer of the product for purchasing one or more product units of the plurality of product units associated with the product. More specifically, each buyer can choose to buy any number of product units as desired. For example, a buyer $B_1$ may purchase 3 product units and a buyer $B_2$ may purchase one product unit.

At operation 706, the method 700 includes facilitating receipt of at least a part payment for the one or more product units purchased by the at least one buyer. For example, the buyer $B_1$ makes a part payment of $150 for the 3 product units and the buyer $B_2$ makes a part payment of $50 for 1 product unit.

At operation 708, the method 700 includes determining at preset intervals a sale status of the product by comparing the total number of product units with a number of sold product units. The sale status indicates a sale complete status if the total number of product units is equal to the number of sold product units. For example, the sale status is complete if the plurality of product units $p_1, p_2, p_3, \ldots, p_{100}$ are purchased by a group of buyers $(B_1, B_2, \ldots, B_{20})$. It shall be noted that the sale status is used to determine if the product P (i.e., secret information) can be revealed to the group of buyers. If the plurality of product units are not sold and if the transaction amount does not exceed the predefined price X, then the sale is not complete and the event status shows pending/incomplete. In such cases, group of buyers (e.g., $B_1, B_2, \ldots, B_{10}$) who made part payments are notified and the part payment collected from the group of buyers (e.g., $B_1, B_2, \ldots, B_{10}$) is refunded. The seller may either re-post the product for sale after modifying sale parameters (e.g., reduce offer price/product unit) or choose not to reveal the information.

At operation 710, the method 700 includes sending an access key for the product to the at least one buyer based, at least in part, on the sale complete status of the product.

The sequence of operations of the method 700 need not be necessarily executed in the same order as they are presented. Further, one or more operations may be grouped together and performed in form of a single step, or one operation may have several sub-steps that may be performed in parallel or in sequential manner.

Figure 8:
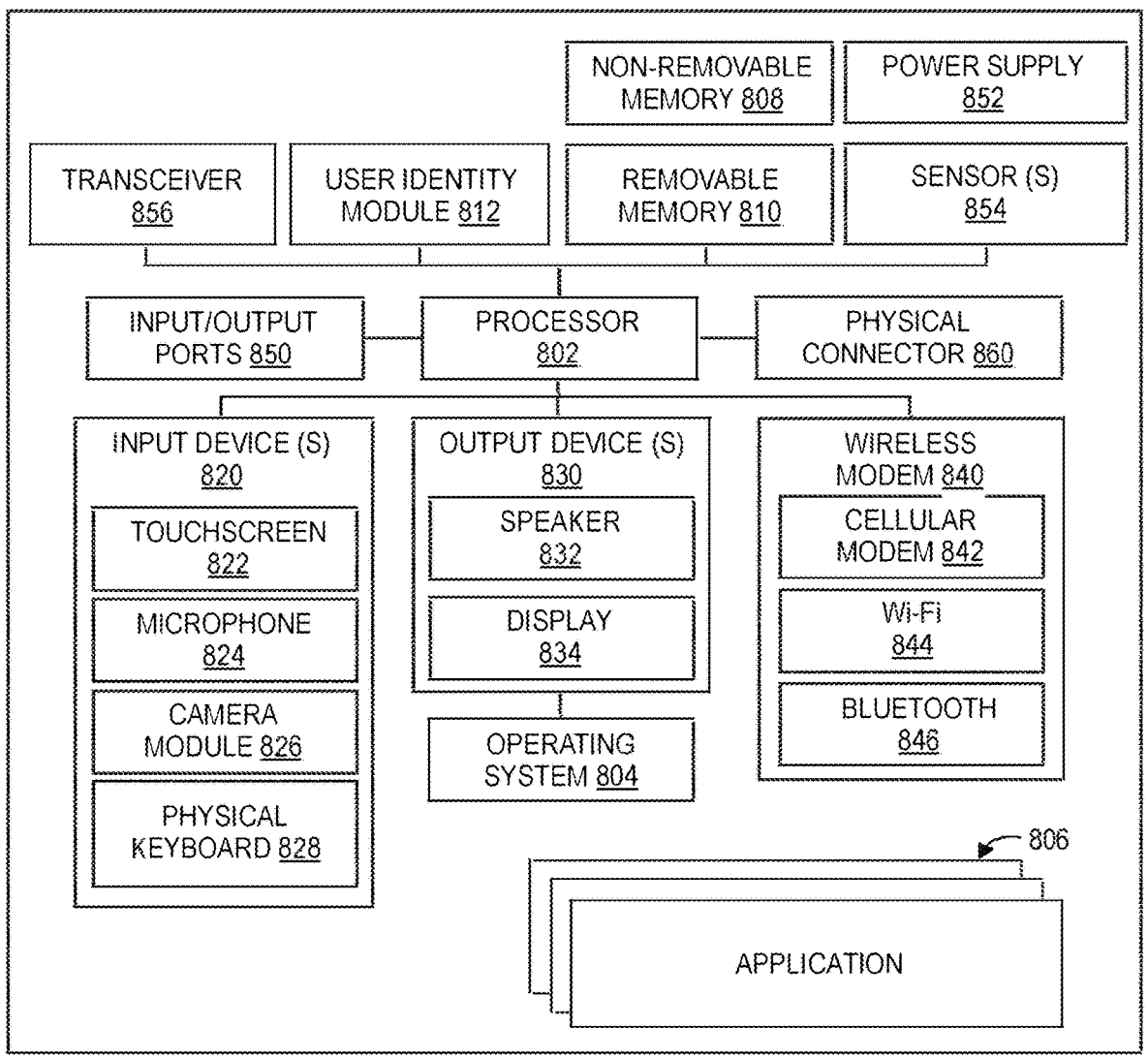
FIG. 8 shows simplified block diagram of an electronic device, for example, a mobile phone capable of implementing the various embodiments of the present disclosure.

FIG. 8 shows a simplified block diagram of an electronic device 800, for example, a mobile phone capable of implementing the various embodiments of the present disclosure. For example, the electronic device 800 may correspond to the seller device 104 associated with the seller 102 or the buyer device 134 associated with the buyer 132 who downloads and installs an e-commerce website (i.e., group purchasing application) for sale and purchase of secret information, respectively. The electronic device 800 is depicted to include one or more applications 806. The applications 806 may include an instance of a group purchasing application downloaded from a third-party server such as, the server system 112.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an example embodiment may include more, less or different components than those described in connection with the example embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800. In addition, the applications 806 may include common server performance monitoring applications or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854, for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (Fire Wire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide access to confidential or undisclosed information to a group of buyers. Various embodiments provide methods and systems for sharing authenticated information directly from the seller (i.e., secret owner) with group of buyers who purchase an access key for the information. Further, the group of buyers is participating in a group purchase of one product whose details are hidden. The buyers do not own the product or have any rights over the product but have only increased the probability of revealing the hidden information. Moreover, the authentication of the product (i.e., secret information) prior to sale precludes false information or incorrect claims from being circulated.

The disclosed methods with reference to FIGS. 1 to 8, or one or more operations of the method 600/700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for group purchase of access to a product, the computer-implemented method comprising:

receiving, by a server system having a digital platform, a processor, and a memory, the digital platform providing an interface to receive commands, a selection of a product, displayed on the interface, in a product list from at least one buyer through a buyer device;

displaying, by the server system and on a second interface, a purchase event associated with the product in response to receiving, by the interface, the selection of the product, the purchase event depicting a plurality of product units displayed as a matrix that make up the product, wherein the matrix includes a plurality of selectable interface elements that represent the plurality of product units;

wherein the purchase event depicts the plurality of the product units based, at least in part, on a plurality of sale parameters, wherein the plurality of sale parameters comprises at least a predefined price for the product, a total number of product units, an offer price for each product unit of the plurality of product units and an event expiration time and wherein the product is information that is confidential or undisclosed by a seller prior to the purchase event, the confidential and undisclosed nature of the information providing value to the product and the plurality of product units are representative of one or more shares of the product;

receiving, by the server system, a user selection of one or more of the plurality of selectable interface elements that represent one or more product units of the plurality of product units, from the at least one buyer through the buyer device, for purchasing the one or more product units of the plurality of product units associated with the product;

in response to receiving the user selection of the one or more of the plurality of selectable interface elements that represent the one or more product units of the plurality of product units, calculating, by the server system, a payment information for the one or more product units of the plurality of product units and prompting the at least one buyer through the second interface to provide payment processing information as part of the payment transaction;

facilitating receipt, by the server system, of at least a part payment for the one or more product units of the plurality of product units;

in response to determining that the one or more product units are purchased, updating the matrix by highlighting the one or more of the plurality of selectable interface elements that represent the one or more product units;

determining at preset intervals, by the server system, a sale status of the product by comparing the total number of the plurality of product units with a number of sold product units, wherein the sale status indicates a sale complete status if the total number of the plurality of product units is equal to the number of sold product units;

sending, by the server system, an access key for the product to the at least one buyer based, at least in part, on the sale complete status of the product, wherein the access key can be at least in the form of a photo, a document, an audio or video recording, a URL, an access code, a software code, a software program, a chemical formula, a date and time in the past or future, a blockchain block, or any type of information in any digital format;

modifying, by the server system, one or more sale parameters of the plurality of sale parameters based, at least in part, on a sale parameter change request;

receiving, by the server system, a product sale request from the seller through a seller device, the product sale request comprising at least a product description, a product category, a seller information and the plurality of sale parameters;

validating, by the server system, the product sale request based at least in part on one or more evidence records provided by the seller using the seller device, wherein the validation is performed to facilitate determining content accuracy of the product prior to the display of the purchase event;

adapting dynamically, by the server system, the offer price of unsold product units among the plurality of product units associated with the product based, at least in part, on a product popularity score;

determining, by the server system, an event status associated with the purchase event by comparing a current time and the event expiration time; and terminating, by the server system, the purchase event in response to determining the current time exceeds the event expiration time.

2. The computer-implemented method as claimed in claim 1, further comprising:
receiving, by the server system and from the seller, the sale parameter change request for facilitating adaptation of the one or more sale parameters of the plurality of sale parameters associated with the purchase event prior to the event expiration time; and
causing, by the server system, display of the purchase event with the one or more sale parameters for the product.

3. The computer-implemented method as claimed in claim 1, further comprising:
tracking, by the server system, at least one of a trending product, a recently introduced product, products in categories preferred by a plurality of buyers, an event expiration product and seller popularity, wherein the tracking is performed to facilitate determination of the product popularity score.

4. The computer-implemented method as claimed in claim 1, further comprising: receiving, by the server system, one or more buyer preferences for receiving the access key for the product.

5. The computer-implemented method as claimed in claim 4, wherein the one or more buyer preferences correspond to:
an electronic mail;
a Short Message Service (SMS);
a social networking handle;
a printed document; and
a voice message.

6. The computer-implemented method as claimed in claim 1, wherein the access key is one or more of:
a text;
an image;
the access code;
the software code;
the software program;
the chemical formula;
the blockchain block;
the document;
the audio; and
the video recording.

7. The computer-implemented method as claimed in claim 1, wherein the plurality of product units are equal product units and the offer price for each product unit of the plurality of product units are the same.

8. The computer-implemented method as claimed in claim 1, wherein the plurality of product units are unequal product units and the offer price is assigned for each product unit of the plurality of product units based at least in part on a size of the product unit.

\* \* \* \* \*